(12) United States Patent
Yoon et al.

(10) Patent No.: US 12,374,500 B2
(45) Date of Patent: Jul. 29, 2025

(54) MULTILAYER ELECTRONIC COMPONENT

(71) Applicant: SAMSUNG ELECTRO-MECHANICS CO., LTD., Suwon-si (KR)

(72) Inventors: Seok Hyun Yoon, Suwon-si (KR); Hyung Soon Kwon, Suwon-si (KR); In Ho Jeon, Suwon-si (KR); Byung Ho Lee, Suwon-si (KR); Mi Yang Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 121 days.

(21) Appl. No.: 18/230,854

(22) Filed: Aug. 7, 2023

(65) Prior Publication Data
US 2024/0355547 A1 Oct. 24, 2024

(30) Foreign Application Priority Data

Apr. 17, 2023 (KR) .................. 10-2023-0050241

(51) Int. Cl.
*H01G 4/30* (2006.01)
*H01G 4/008* (2006.01)
(Continued)

(52) U.S. Cl.
CPC ............ *H01G 4/30* (2013.01); *H01G 4/008* (2013.01); *H01G 4/012* (2013.01); *H01G 4/1227* (2013.01)

(58) Field of Classification Search
CPC .......... H01G 4/30; H01G 4/008; H01G 4/012; H01G 4/1227
See application file for complete search history.

(56) References Cited

U.S. PATENT DOCUMENTS 6,301,092 B1   10/2001  Hata et al.
9,440,885 B2 *  9/2016  Morigasaki ......... C04B 35/4682
(Continued)

FOREIGN PATENT DOCUMENTS

CN   107266063 A  * 10/2017  ........... C01G 25/006
JP   2001-6966 A     1/2001
(Continued)

OTHER PUBLICATIONS

Seok-Hyun Yoon, et al., "Effect of the pyrochlore (Y2Ti2O7) phase on the resistance degradation in yttrium-doped BaTiO3 ceramic capacitors", J. Mater. Res., 22 [9] 2539-43 (2007).
(Continued)

*Primary Examiner* — Michael P McFadden
(74) *Attorney, Agent, or Firm* — MORGAN, LEWIS & BOCKIUS LLP

(57) ABSTRACT

A multilayer electronic component includes a body including a dielectric layer and an internal electrode; and an external electrode disposed on the body, wherein the dielectric layer includes a rare earth element, a secondary phase of the rare earth element and a dielectric grain, wherein, when an average thickness of the dielectric layer is defined as td and a maximum size of the dielectric layer of a secondary phase of the rare earth element in the thickness direction is defined as D, the dielectric layer includes two or more secondary phases of a rare earth element satisfying D/td≤0.2.

20 Claims, 9 Drawing Sheets

(51) Int. Cl.
*H01G 4/012* (2006.01)
*H01G 4/12* (2006.01)

(56) References Cited

U.S. PATENT DOCUMENTS

| | | |
|---|---|---|
| 2010/0014214 A1 | 1/2010 | Yamazaki et al. |
| 2011/0194228 A1 | 8/2011 | Ishihara |
| 2013/0119827 A1 | 5/2013 | Kang et al. |
| 2013/0222968 A1 | 8/2013 | Koga et al. |
| 2014/0009864 A1 | 1/2014 | Takashima et al. |
| 2014/0313634 A1* | 10/2014 | Yoon ........................ H01G 4/30 501/137 |
| 2015/0299048 A1 | 10/2015 | Yoon et al. |
| 2021/0210288 A1* | 7/2021 | Kang ........................ C04B 35/49 |
| 2022/0399165 A1* | 12/2022 | Kim ........................ H01G 4/30 |

FOREIGN PATENT DOCUMENTS

| | | | |
|---|---|---|---|
| JP | 2011-162401 A | 8/2011 | |
| JP | 2013-103876 A | 5/2013 | |
| JP | 2021-70595 A | 5/2021 | |
| JP | 2021-070596 A | 5/2021 | |
| KR | 10-2001-0029809 A | 4/2001 | |
| KR | 10-2011-0093618 A | 8/2011 | |
| KR | 10-2015-0121569 A | 10/2015 | |
| WO | WO-2004038743 A1 * | 5/2004 | ......... C04B 35/4682 |
| WO | WO-2017012790 A1 * | 1/2017 | ........... C04B 35/462 |

OTHER PUBLICATIONS

Extended European Search Report issued in corresponding European Patent Application No. 23188414.9 dated Mar. 19, 2025.

* cited by examiner

MULTILAYER ELECTRONIC COMPONENT

CROSS-REFERENCE TO RELATED APPLICATION(S)

This application claims benefit of priority to Korean Patent Application No. 10-2023-0050241 filed on Apr. 17, 2023 in the Korean Intellectual Properties Office, the disclosure of which is incorporated herein by reference in its entirety.

BACKGROUND

1. Technical Field

The present disclosure relates to a multilayer electronic component.

2. Description of Related Art

A multilayer electronic component (MLCC), a multilayer electronic component, may be a chip condenser mounted on the printed circuit boards of various electronic products including as image display devices such as a liquid crystal display (LCD) and a plasma display panel (PDP), a computer, a smartphone, and a mobile phone, charging or discharging electricity therein.

Such a multilayer ceramic capacitor may be used as a component of various electronic devices, as a multilayer ceramic capacitor may have a small size and high capacitance and may be easily mounted. As various electronic devices such as computers and mobile devices have been miniaturized and high-output, demand for miniaturization and high capacitance multilayer ceramic capacitors has been increased.

With the expansion of the market for MLCC for IT and also MLCC for electric vehicles, demand for products with a high rated voltage and excellent reliability in the same capacity range has increased. Generally, it is known that the smaller the grain size and the more grain boundaries, the better the reliability of the dielectric. Among the MLCC dielectric composition additive elements, the effect of valence fixed acceptor, valence variable acceptor, transition metal element, and rare earth element on reliability has already known, and generally, conditions with good reliability may be selected through optimization of a composition ratio of dielectric additive elements including the above-mentioned elements. While a base metal electrode (BME) MLCC has been industrialized for more than 30 years, there has been attempts to improve reliability has been continuously conducted, and such cases have already been reported in many patents. Recently, it has been reported that, even with the same dielectric composition, there may be a significant difference in reliability depending on a microstructure, the distribution and the solid state of additive elements, and process conditions, and research thereon has been actively conducted.

SUMMARY

An example embodiment of the present disclosure is to provide a multilayer electronic component having improved reliability.

An example embodiment of the present disclosure is to provide a multilayer electronic component which may satisfy X7R or X7S properties.

An example embodiment of the present disclosure is to provide a multilayer electronic component having improved MTTF with high temperature and high accelerated life.

An example embodiment of the present disclosure is to provide a multilayer electronic component having improved capacitance.

According to an example embodiment of the present disclosure, a multilayer electronic component includes a body including a dielectric layer and an internal electrode; and an external electrode disposed on the body, wherein the dielectric layer includes a rare earth element, a secondary phase of the rare earth element and a dielectric grain, wherein, an average thickness of the dielectric layer is defined as td, a maximum size of the secondary phase of the rare earth element in a thickness direction of the dielectric layer is defined as D, and two or more secondary phases satisfies $D/td \le 0.2$, and wherein the dielectric grain includes a first dielectric grain having a core-shell structure including a core portion and a shell portion disposed on at least a portion of the core portion, and a ratio of a number of moles of the rare earth element to a total number of moles of the entirety of elements other than an oxygen element is defined as RE, a shell portion of the first dielectric grain includes a region satisfying $1.5\% \le RE \le 3.0\%$.

According to an example embodiment of the present disclosure, a multilayer electronic component includes a body including a dielectric layer and an internal electrode; and an external electrode disposed on the body, wherein the dielectric layer includes a rare earth element, a secondary phase of the rare earth element and a dielectric grain, wherein the dielectric grain includes a first dielectric grain having a core-shell structure including a core portion and a shell portion disposed on at least a portion of the core portion, and a ratio of a number of moles of the rare earth element to a total number of moles of the entirety of elements other than an oxygen element is defined as RE, a shell portion of the first dielectric grain includes a region satisfying $1.5\% \le RE \le 3.0\%$.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
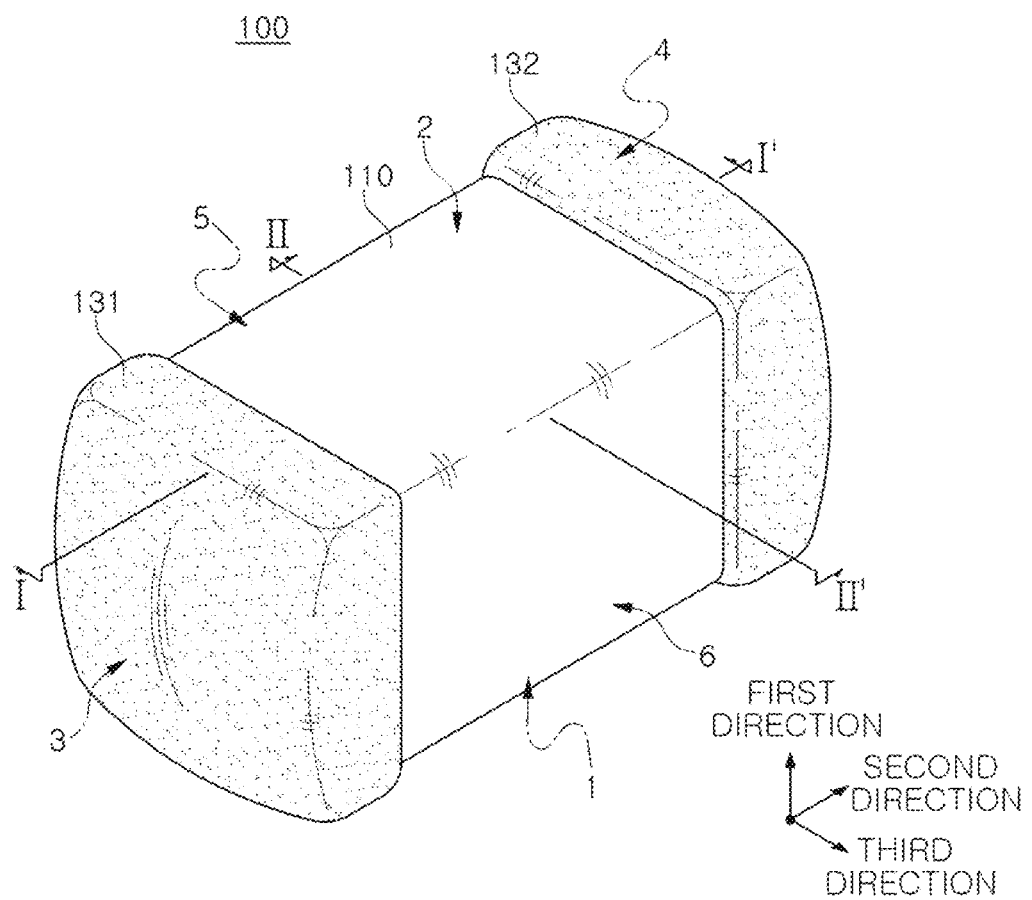
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
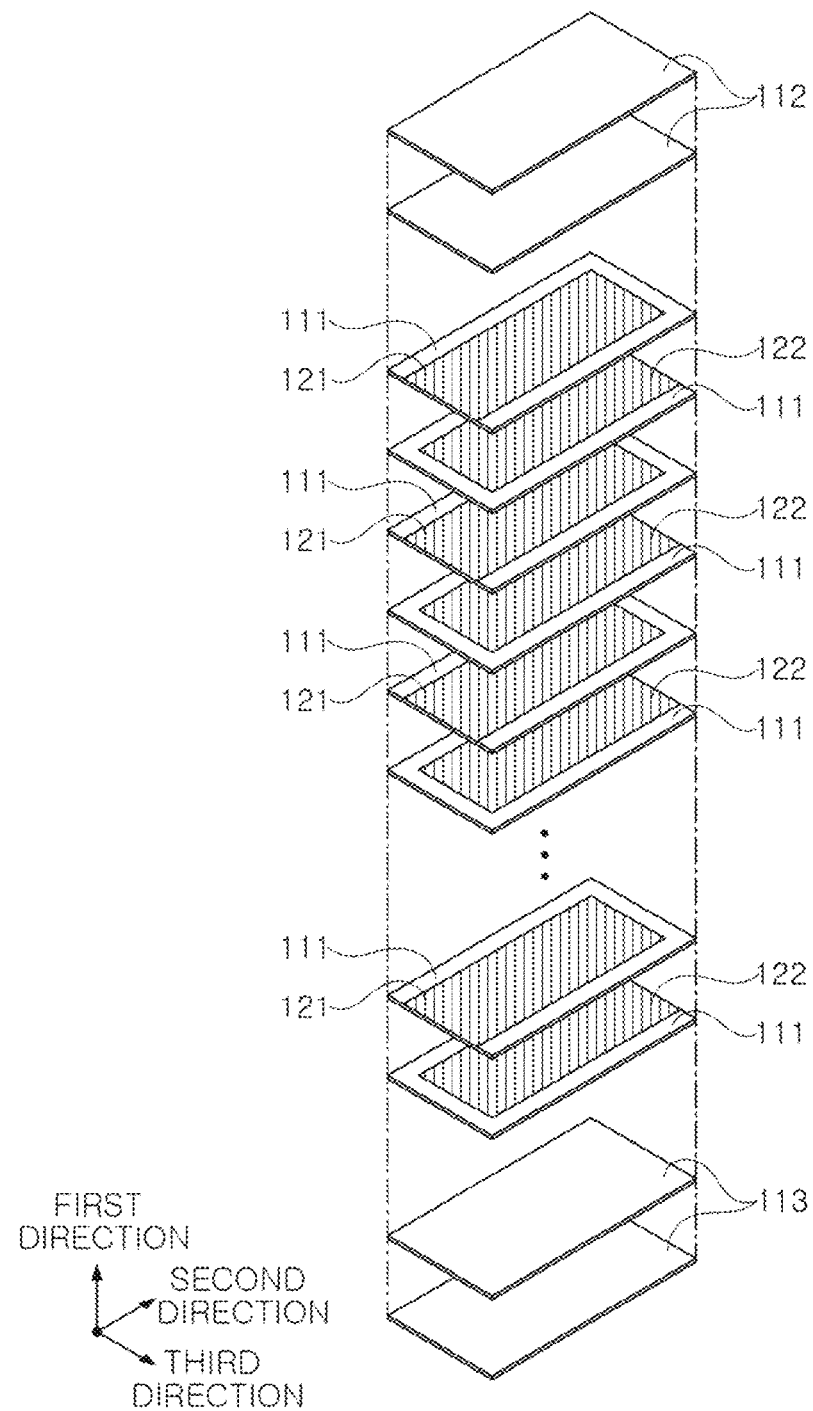
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figure 3:
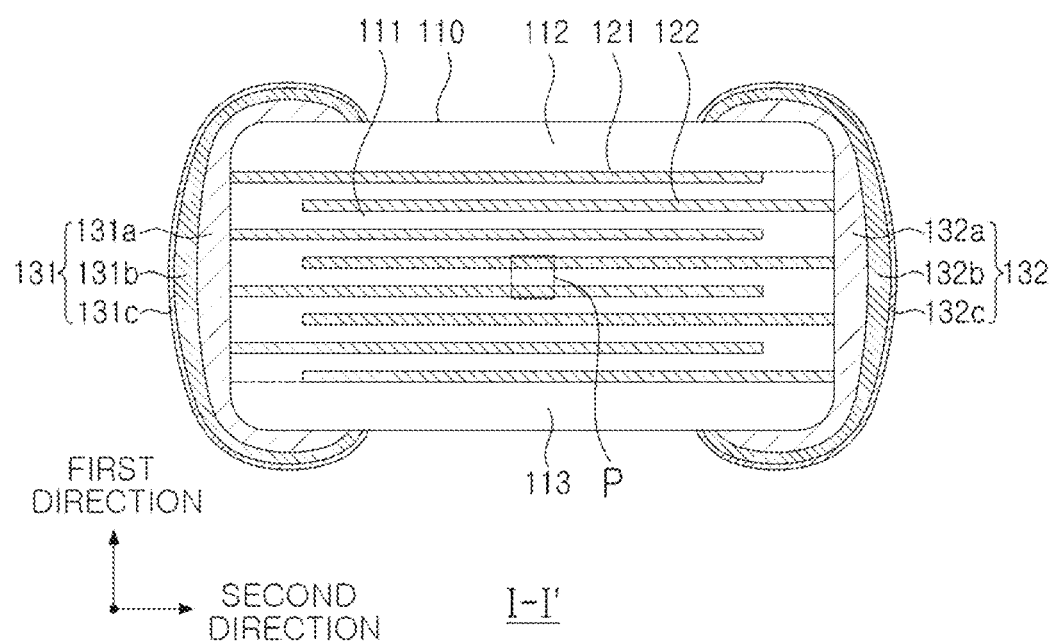
FIG. 3 is a cross-sectional diagram taken along line I-I' in FIG. 1.

FIG. 3 is a cross-sectional diagram taken along line I-I' in FIG. 1.

Figure 4:
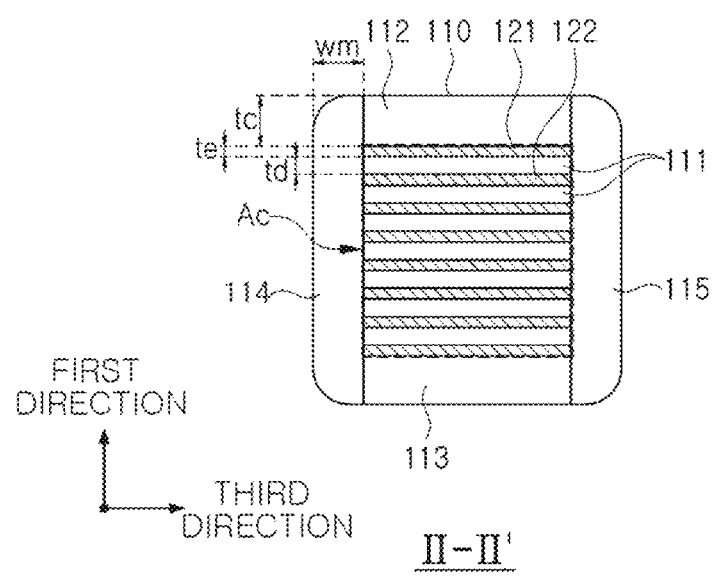
FIG. 4 is a cross-sectional diagram taken along line II-II' in FIG. 1.

FIG. 4 is a cross-sectional diagram taken along line II-II' in FIG. 1.

Figure 5:
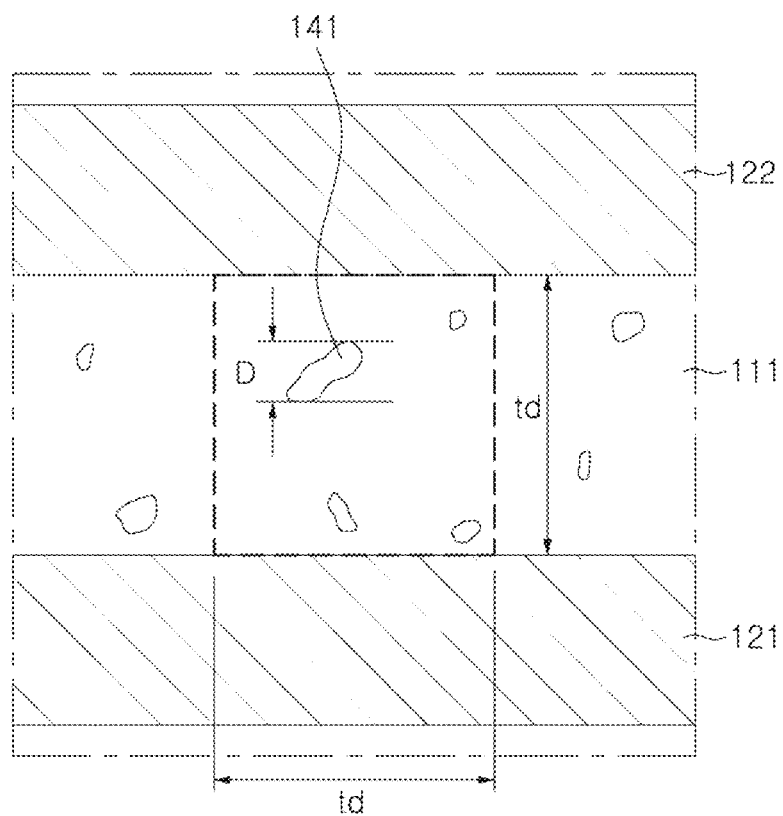
FIG. 5 is an enlarged diagram illustrating region P in FIG. 3.

FIG. 5 is an enlarged diagram illustrating region P in FIG. 3.

Figure 6:
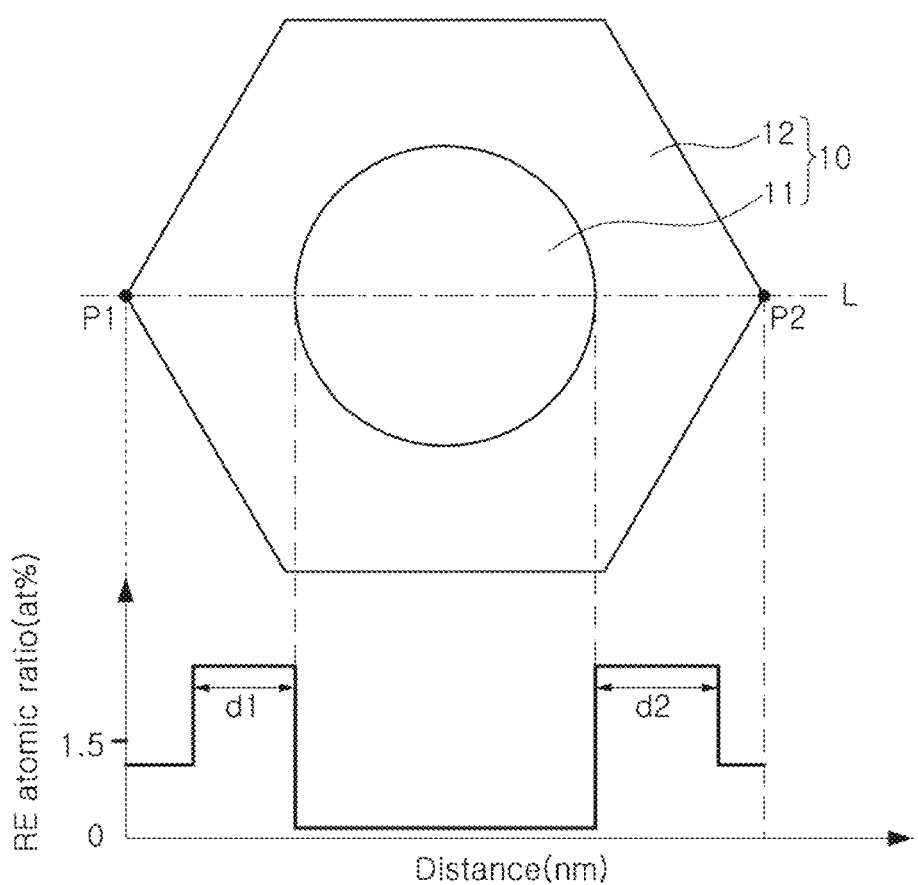
FIG. 6 is a diagram illustrating a structure of a first dielectric grain having a core-shell structure and an atomic percentage of rare earth element for each region included therein according to an example embodiment of the present disclosure.

FIG. 6 is a diagram illustrating a structure of a first dielectric grain having a core-shell structure and an atomic percentage of rare earth element for each region included therein according to an example embodiment.

Hereinafter, a multilayer electronic component according to an example embodiment will be described in greater detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a

In the body 110, the dielectric layers 111 and the internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(T_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The thickness td of the dielectric layer 111 may not be limited to any particular example.

However, to easily implement high capacitance of the multilayer electronic component 100, the thickness td of the dielectric layer 111 may be 5.0 µm or less, preferably 4.0 µm or less, and more preferably 3.0 µm or less. Also, to easily implement miniaturization and high capacitance of the multilayer electronic component 100, the thickness td of the dielectric layer may be 1.0 µm or less, preferably 0.6 µm or less, and more preferably 0.4 µm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 5 points spaced apart by an equal size in the first direction in the scanned image. The 5 points at equal sizes may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

With the expansion of the market for MLCC for IT and also MLCC for electric vehicles, demand for products with a high rated voltage and excellent reliability in the same capacity range has increased. Generally, it is known that the smaller the grain size and the more grain boundaries, the better the reliability of the dielectric. Among the MLCC dielectric composition additive elements, the effect of valence fixed acceptor, valence variable acceptor, transition metal element, and rare earth element on reliability has already known, and generally, conditions with good reliability may be selected through optimization of a composition ratio of dielectric additive elements including the above-mentioned elements. While a base metal electrode (BME) MLCC has been industrialized for more than 30 years, there has been attempts to improve reliability has been continuously conducted, and such cases have already been reported in many patents. Recently, it has been reported that, even with the same dielectric composition, there may be a significant difference in reliability depending on a microstructure, the distribution and the solid state of additive elements, and process conditions, and research thereon has been actively conducted.

The dielectric of high-capacity BME MLCCs such as X5R, X7R, X8R, and Y5V currently used may be based on a sintered material by co-doping fixed valence acceptor elements such as Mg and Al, and rare earth elements acting as donors such as Y, Dy, Ho, and Er to base materials such as $BaTiO_3$ base material or $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$ modified by partially employing Ca and Zr and additionally adding variable valence acceptor elements such as Mn, V, Cr, extra Ba, and $SiO_2$ or a sintering aid including the elements. When firing in a reducing atmosphere, it is known that grain growth suppression and reduction resistance may need to be implemented to realize normal capacity and insulating properties of high-capacity MLCC, and these two effects may be realized by adding an appropriate amount of a fixed valence acceptor element such as Mg. However, when only a fixed valence acceptor element such as Mg is added, withstand voltage properties of dielectric and reliability may not be good, and by adding a transition metal element and a rare earth element, which are variable valence acceptor elements such as Mn and V together, the effect of improving withstand voltage and reliability may be obtained. Most of these elements are co-doped and employed in the shell region of the $BaTiO_3$ base material grain, may form a core-shell structure, and may realizing stable capacitance properties and reliability according to the temperature of MLCC.

Here, the rare earth element may improve accelerated life or reliability, and it is observed that the properties of the element may be further improved as solid solution of the elements increases in the $BaTiO_3$ lattice. However, when the amount of rare earth element is excessively added, a giant secondary phase of a high content of rare earth element may be created, such as Pyrochlore (e.g., $Re_2Ti_2O_7$, where Re is Y, Dy, Ho, and Yb, etc.) or $RE_2Si_2O_7$, such that an accelerated life may be deteriorated greatly.

However, in an embodiment, the size of a secondary phase, which has a high content of rare earth element, may be small and uniformly distributed below a predetermined size as based on the thickness of the dielectric layer, and also, when the content of the rare earth element included in the shell portion of barium titanate ($BaTiO_3$ dielectric grain), the main component, has a specific distribution, X7R-TCC temperature properties may be satisfied, and dielectric capacitance and reliability may be improved.

Specifically, target properties may be to satisfy at least one of properties among dielectric constant ≥2000, mean time to failure (MTTF) of more than 150 hours under the HALT condition at a temperature of 150° C. and applying electric field of 43 V/μm, RC value ≥1000 ΩF, TCC properties of −15% to +15% in the temperature range of −55° C. to 125° C., may be satisfied, and preferably, target properties may be to satisfy the entirety of the properties.

The dielectric layer 111 may include a rare earth element and a secondary phase 141 of the rare earth element. In this case, when the average thickness of the dielectric layer 111 is defined as td and the size of the dielectric layer 111 in the thickness direction of the secondary phase 141 of the rare earth element is defined as D, the dielectric layer may include two or more secondary phases of rare earth element satisfying D/td≤0.2.

Here, the secondary phase 141 of the rare earth element may have a ratio or percentage (%) of the number of moles of the rare earth element to the number of moles of the entirety of elements excluding the oxygen element.

In this case, the dielectric layer 111 may include two or more secondary phases of a rare earth element satisfying D/td≤0.2 in a td μm×td μm region.

An upper limit of the number of secondary phases of rare earth elements satisfying D/td≤0.2 in the td μm×td μm region may not be limited to any particular example, and when the thickness td of the dielectric layer is 5 μm or less, the number of the secondary phases may be 7 preferably, and when the thickness td of the dielectric layer exceeds 5 μm, more than 7 secondary phases may be included.

Here, in the td μm×td μm region, the size in the thickness direction of the dielectric layer may be the same as td μm, which is the average thickness of the dielectric layer, and the size in the direction perpendicular to the thickness direction of the dielectric layer may be the same as td μm, the average thickness of the dielectric layer, and may refer to a quadrangular region having an area obtained by multiplying the size td μm in the thickness direction of the dielectric layer and the size td μm in the direction perpendicular to the thickness direction of the dielectric layer. For example, with respect to the cross-section of the dielectric layer 111 in the first and second directions, the region may refer to a quadrangular region in which a size in a first direction is td μm and a size in a second direction is td μm.

Also, D may refer to a maximum size in the thickness direction of the dielectric layer of the secondary phase 141 of the rare earth element. For example, D may refer to a value of the size between two linear lines in the first direction by drawing two random linear lines in the second direction to include both end points in the first direction among the regions of the secondary phase 141 of the rare earth element observed in the first and second direction cross-section of the dielectric layer 111 through SEM, TEM and STEM. Other methods and/or tools appreciated by one of ordinary skill in the art, even if not described in the present disclosure, may also be used.

Also, the types and contents of elements included in the secondary phase 141 of the rare earth element may also be measured by calculating an average value of the region or points in the secondary phase 141 of the rare earth element through the EDS analysis mode of SEM, TEM and STEM.

Other methods and/or tools appreciated by one of ordinary skill in the art, even if not described in the present disclosure, may also be used.

The configuration of including two or more secondary phases of rare earth elements satisfying D/td≤0.2 in the td μm×td μm region of the dielectric layer may indicate that, among the dielectric layers, it may be sufficient to include at least one region including two or more secondary phases of rare earth elements satisfying D/td≤0.2 within the td μm×td μm region, and it may not be necessary to satisfy the conditions in the entirety of the dielectric layers.

By including two or more secondary phases of a rare earth element in which the dielectric layer 111 satisfies D/td≤0.2, at least one of properties among dielectric constant ≥2000, mean time to failure (MTTF) of more than 150 hours under the HALT condition at a temperature of 150° C. and applying electric field of 43 V/μm, RC value ≥1000 ΩF, TCC properties of −15% to +15% in the temperature range of −55° C. to 125° C., may be satisfied.

The dielectric layer 111 may include a dielectric grain, and the dielectric grain may include a first dielectric grain 10 having a core-shell structure including an inner core portion 11 and a shell portion 12 disposed on at least a portion of the core portion 11. However, an embodiment thereof is not limited thereto, and second dielectric grains not having a core-shell structure may be included.

In this case, when the ratio of the number of moles of the rare earth element to the total number of moles of the entirety of elements excluding the oxygen element is defined as RE, the shell portion 12 of the first dielectric grain may include a region satisfying 1.5%≤RE≤3.0%. Here, the total elements excluding the oxygen element may mean that the rare earth element is included.

As a specific example of a method of measuring the content of each element included in the shell portion 12, in the case of a destruction method, TEM-EDS or STEM-EDS may be used to analyze the components in the dielectric grains in the central portion of the chip. First, a thinned analysis sample may be prepared using a focused ion beam (FIB device) in the region including the dielectric layer on an end surface of the body after sintering. Thereafter, the damage layer on the surface of the thinned sample using Ar ion milling may be removed, and qualitative/quantitative analysis may be performed by mapping each component in the image obtained using (S)TEM-EDS. In this case, the qualitative/quantitative analysis graph of each component may be represented in terms of mass fraction (wt %), atomic percentage (at %), or mole fraction (mol %) of each element.

As another method, after crushing the chip and removing the internal electrode, a portion of the dielectric layer may be selected, and the components of the dielectric layer may be analyzed using devices such as an inductively coupled plasma spectrometer (ICP-OES) and an inductively coupled plasma mass spectrometer (ICP-MS) for the selected dielectric layer.

For example, RE may be measured as below. First, a random 2.5 μm×2.5 μm region of the dielectric layer 111 was imaged at an accelerating voltage of 200 kV, HAADF mode, and 50,000× magnification using STEM device, and EDS Mapping analysis was performed again on a random 1 μm×1 μm region. The resolution was 512×512 pixels, and each pixel received a signal for 30 ms to form an image. Thereafter, after selecting a random dielectric grain included in the 1 μm×1 μm region, a line-profile was performed to pass through the center. Data of 200 points was obtained from one line, and intensity at each point may correspond to a signal obtained by repeating 5 times for 10 seconds. RE may be obtained by calculating the ratio or percentage (%) of the total number of moles of the rare earth element to the total number of moles of the entirety of elements excluding oxygen element (O) among the elements measured in the line profile.

The ratio or percentage (%) of the number of moles of the rare earth element to the total number of moles of the entirety of elements excluding the oxygen element may be substantially the same as the atomic percentage (at %), and the entirety of elements except oxygen may also include rare earth elements, which may refer to, for example, a percentage (%) value of [rare earth elements]/([Ba]+[Ti]+[rare earth elements]+[Mg]+[Mn]+[V]+[Si]+[Ca]+[Zr]+ . . . ). Here, square brackets ([ ]) may refer to the measured atomic percentage (at %) of each element.

Also, the notion that the shell portion 12 may include a region satisfying 1.5%≤RE≤3.0% may not indicate that the entirety of regions of the shell portion 12 needs to satisfy 1.5%≤RE≤3.0%, and it may be sufficient to include a region satisfying 1.5%≤RE 3.0%.

When the length of the first dielectric grain 10 is defined as G, and the length of a region satisfying 1.5%≤RE≤3.0% of the shell portion 12 of the first dielectric grain is defined as d with respect to the linear line L passing through the center of the first dielectric grain 10, 2.5%≤d/G≤47.0% may be satisfied.

Here, referring to FIG. 6, as described above, since the shell portion 12 may surround at least a portion of the core portion 11, a region satisfying 1.5%≤RE≤3.0% may have more than two regions, and the lengths of the two regions may be defined as d1 and d2 with respect to the linear line L. In this case, each region may satisfy 2.5%≤d1/G≤47.0% and 2.5%≤d2/G≤47.0%.

When d/G is less than 2.5%, reliability may deteriorate, and when d/G exceeds 47.0%, dielectric properties may deteriorate.

Here, d or G may be measured using SEM, TEM, STEM devices, but an embodiment thereof is not limited thereto. For example, by selecting 10 first dielectric grains to be measured through STEM device and drawing a linear line through the center, the values may be calculated through a program. Here, a linear line passing through the center may refer to the aforementioned line profile. Other methods and/or tools appreciated by one of ordinary skill in the art, even if not described in the present disclosure, may also be used.

The length G of the dielectric grain 10 may be 170 nm or more and 400 nm or less, and the length d of a region satisfying 1.5%≤RE≤3.0% of the shell portion 12 of the first dielectric grain may be 10 nm or more and 80 nm or less.

When G is less than 170 nm, it may be difficult to satisfy target dielectric properties, and when G is greater than 400 nm, it may be difficult to reduce the thickness of the dielectric layer.

When d is less than 10 nm, the region of the shell portion may be relatively small, such that reliability may be deteriorated. When d is greater than 80 nm, the region of the shell portion may be relatively large, and dielectric properties may be deteriorated.

Also, according to an embodiment, the dielectric layer 111 may include three or more first dielectric grains 10 having a shell portion 12 including a region satisfying 1.5%≤RE≤3.0% in a 1 μm×1 μm region.

Here, the 1 μm×1 μm region may refer to a quadrangular region having a size of 1 μm in the thickness direction of the dielectric layer and a size of 1 μm in a direction perpendicular to the thickness direction of the dielectric layer. For example, the region may refer to a quadrangular region in which a size in a first direction is 1 μm and a size in a second direction is 1 μm based on cross-sections in first and second directions.

By including three or more first dielectric grains 10 having a shell portion 12 including a region satisfying 1.5%≤RE≤3.0% in a 1 μm×1 μm region of the dielectric layer 111, at least one of properties among dielectric constant ≥2000, mean time to failure (MTTF) of more than 150 hours under the HALT condition at a temperature of 150° C. and applying electric field of 43 V/μm, RC value ≥1000 ΩF, TCC properties of −15% to +15% in the temperature range of −55° C. to 125° C. may be satisfied.

In an embodiment, the dielectric layer 111 may include a main component and a subcomponent including Ti, Ti may be derived from a main component (e.g., $BaTiO_3$), and the subcomponent may be derived from an additive.

In the example embodiment, the dielectric composition may be described on the basis of including the dielectric main component and the subcomponent before firing, and the dielectric grain may be described on the basis of including the content of the dielectric main component and the subcomponent after firing, but the content of each element described in dielectric main component and subcomponent may remain without significant errors before and after firing.

In the example embodiment, "main component" may refer to a component occupying a relatively large proportion as based on other components, and may refer to a component that is 50 at % or more based on the content of the entire composition or the entire dielectric layer.

Also, in the example embodiment, "subcomponent" may refer to a component occupying a relatively small proportion based on the main component, and may refer to a component which is less than 50 at % based on the content of the entire composition or the entire dielectric layer.

Hereinafter, subcomponents which may be included in the dielectric layer 111 will be described in detail. The subcomponents described in the example embodiment will be described based on the number of moles of elements, and may be calculated by converting to the added content of the oxide or carbonate of the additive before firing. As described above, the content of elements before and after firing may not have a significant error value unless there are special circumstances, and as described above, types and contents of elements included in the dielectric layer 111 may be measured by various measurement methods such as SEM-EDS, TEM-EDS and STEM-EDS in a chip state after firing. Other methods and/or tools appreciated by one of ordinary skill in the art, even if not described in the present disclosure, may also be used.

As an example of a method of measuring the content of each element included in the dielectric layer 111, in the case of the destruction method, TEM-EDS or STEM-EDS may be used to analyze the components in the dielectric grains in the central portion of the chip. First, in the region including the dielectric layer among the end surfaces of the body after sintering, a thinned analysis sample may be prepared using focused ion beam (FIB) device. Thereafter, the damage layer on the surface of the thinned sample may be removed using Ar ion milling, and qualitative/quantitative analysis may be performed by mapping each component in the image obtained using (S)TEM-EDS. In this case, the qualitative/quantitative analysis graph of each component may be represented in terms of mass fraction (wt %), atomic percentage (at %), or mole fraction (mol %) of each element.

As another method, after crushing the chip and removing the internal electrode, a portion of the dielectric layer may be selected, and the components of the dielectric layer may be analyzed using devices such as an inductively coupled plasma spectrometer (ICP-OES) and an inductively coupled plasma mass spectrometer (ICP-MS) for the selected dielectric layer.

a) First Subcomponent

According to an embodiment, the subcomponent may include a first subcomponent including a variable valence acceptor element, the variable valence acceptor element may include one or more of Mn, V, Cr, Fe, Co, Ni, Cu, Co and Zn, and the content of the first subcomponent may be 0.2 mol or more and 1.4 mol or less relative to 100 mol of Ti.

The first subcomponent may be obtained by adding one or more of oxides or carbonates of a variable valence acceptor element, and when a plurality of first subcomponent elements are added, the total content of these elements may be defined as the content of the first subcomponent.

The variable valence acceptor element included in the first subcomponent may improve firing temperature reduction, dielectric properties and high-temperature accelerated life properties of a multilayer electronic component to which a dielectric composition is applied.

When the content of the first subcomponent is less than 0.2 moles based on 100 mol of Ti, high-temperature accelerated life may be deteriorated, and when the content of the first subcomponent is greater than 1.4 moles based on 100 mol of Ti, a dielectric constant may be deteriorated.

b) Second Subcomponent

According to an embodiment, the subcomponent may include a second subcomponent including Mg, and the content of the second subcomponent may be 2.0 mol or less based on 100 mol of Ti.

The second subcomponent may be one or more of Mg oxide and carbonate.

Mg of the second subcomponent may provide reduction resistance and may increase the RC value.

Here, the second subcomponent may not be an essential component, and even when it is not added, target properties may be satisfied by the appropriate added content of other components.

However, when the content of the second subcomponent exceeds 2.0 moles based on 100 mol of Ti, TCC may not satisfy the X7R properties.

c) Third Subcomponent

According to an embodiment, the subcomponent may include a third subcomponent including a rare earth element, the rare earth element may include at least one of Y, Dy, Tb, Ho, Er, Gd, Ce, Nd, Sm, Tm, La and Yb, and the content of the third subcomponent may be 2.5 moles or more and 8.0 moles or less based on 100 mol of Ti.

The third subcomponent may be obtained by adding one or more of rare earth element oxides and carbonates.

The rare earth element included in the third subcomponent may improve the targeted high-temperature accelerated life.

When the content of the third subcomponent is less than 2.5 moles or greater than 8.0 moles based on 100 mol of Ti, a room temperature dielectric constant or insulation resistance properties may be deteriorated.

d) Fourth Subcomponent

According to an embodiment, the subcomponent may include a fourth subcomponent including at least one circle of Ba and Ca, and the content of the fourth subcomponent may be 4.8 moles or less based on 100 mol of Ti.

The fourth subcomponent may be obtained by adding at least one of oxide and carbonate of at least one element of Ba and Ca.

As for Ba and Ca, Due to $BaTiO_3$, (Ba, Ca) $TiO_3$ which may be used as the base material main component, the content of subcomponents detected in the dielectric layer may be inaccurate, and accordingly, Ba and Ca will be described based on the added content of the dielectric composition before firing.

Here, the fourth subcomponent may not be an essential component, and even when it is not added, target properties may be satisfied by proper added content of other components.

When the content of the fourth subcomponent exceeds 4.8 moles based on 100 mol of Ti, a room temperature dielectric constant and a high-temperature withstand voltage may be lowered.

e) Fifth Subcomponent

According to an embodiment, the subcomponent may include a fifth subcomponent including Si, the content of the fifth subcomponent may be 1.0 mol or more and less than 4.0 mol based on 100 mol of Ti, and a preferable lower limit value may be 1.5 mol or more, a more preferable lower limit value may be 1.65 mol or more, a preferable upper limit may be 3.5 mol or less, and a more preferable upper limit may be 3.0 mol or less.

The fifth subcomponent may be obtained by adding at least one of Si oxide, Si carbonate and Si-including glass.

When the content of the fifth subcomponent is less than 1.0 moles based on 100 mol of Ti, firing density may be low such that high-temperature life properties may be deteriorated, when the content is more than 4.0 mol, the secondary phase may be excessively generated such that the room temperature dielectric constant and high-temperature life properties may be deteriorated.

Also, when the fourth subcomponent and the fifth subcomponent are simultaneously added, the ratio of the content of the fourth subcomponent to the content of the fifth subcomponent may be 1.60 or less based on 100 mol of Ti.

When the ratio of the content of the fourth subcomponent to the content of the fifth subcomponent exceeds 1.60, a room temperature dielectric constant and a high-temperature withstand voltage may decrease.

Meanwhile, the internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4.

In this case, the first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component, the thickness te of the internal electrode may be 1.0 μm or less, and to easily implement miniaturization and high capacitance of the multilayer electronic component, the thickness te of the internal electrode may be 0.6 μm or less, more preferably 0.4 μm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average size of the internal electrodes 121 and 122 may be measured by scanning a cross-section of the body 110 in the first direction using a scanning electron microscope (SEM) with a magnification of 10,000. More specifically, an average value may be measured from the size of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average size of the internal electrodes 121 and 122 may be further generalized. Other methods and/or tools appreciated by one of ordinary skill in the art, even if not described in the present disclosure, may also be used.

In an embodiment, the average thickness td1 of at least one of the plurality of dielectric layers 111 and the average thickness te1 of at least one of the plurality of internal electrodes 121 and 122 may satisfy te1<td1, and more preferably te1×2<td1 may be satisfied.

In other words, the average thickness of one dielectric layer td1 may be greater than the average thickness te1 of one of the first and second internal electrodes 121 and 122, and preferably, the average thickness td1 of a dielectric layer may be greater than twice the average thickness te1 of one of the first and second internal electrodes 121 and 122.

Generally, a reliability issue caused by a decrease in a breakdown voltage (BDV) in a high voltage environment may be a major issue in electronic components for high voltage electric vehicles.

Accordingly, to prevent a decrease in breakdown voltage under a high voltage environment, by configuring the average thickness td of the dielectric layer 111 to be larger than the average thickness te of the internal electrodes 121 and 122, the thickness of the dielectric layer, which is the distance between internal electrodes, may be increased and the breakdown voltage properties may be improved.

When the average thickness td of the dielectric layer 111 is less than the average thickness te of the internal electrodes 121 and 122, the average thickness of the dielectric layer, which is the distance between internal electrodes, may be thin, such that the breakdown voltage may decrease, and short circuit may occur between internal electrodes.

In a high voltage electronic component, an average thickness te of an internal electrode may be 1 µm or less, and an average thickness td of a dielectric layer may be 3.0 µm or less, but an embodiment thereof is not limited thereto.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, and may prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 µm or less, preferably 30 µm or less. More preferably, the thickness may be 20 µm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average size of the cover portions 112 and 113 may be measured by scanning a cross-section of the body 110 in the first and second directions using a scanning electron microscope (SEM) with a magnification of 10,000. More specifically, an average value may be measured from the size of the cover portion at 30 points spaced apart by an equal distance in the first direction in the scanned image. Other methods and/or tools appreciated by one of ordinary skill in the art, even if not described in the present disclosure, may also be used.

Also, the average size of the cover portion in the first direction measured by the above method may be substantially the same as the average size of the cover portion in the first direction in the cross-sections of the body 110 in the first and third directions.

The multilayer electronic component 100 may include side margin portions 114 and 115 disposed on end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The side margin portions 114 and 115 may basically prevent damages to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of the first and second side margin portions 114 and 115 may not need to be limited to any particular example.

However, to easily obtain miniaturization and high capacitance of the multilayer electronic component 100, the width wm of the side margin portions 114 and 115 may be 100 µm or less, preferably 30 µm or less, and may be more preferably 20 µm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 10 points spaced apart from each other by an equal distance in the first direction in the scanned image of one of the side margin portions. Other methods and/or tools appreciated by one of ordinary skill in the art, even if not described in the present disclosure, may also be used.

In an example embodiment, the multilayer electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a and 132a, 131b, and 132b disposed on the body 110 and plating layers 131c and 132c disposed on the electrode layers 131a and 132a, 131b, and 132b.

For a more specific example of the electrode layers 131a and 132a, 131b, and 132b, the electrode layers 131a and 132a, 131b, and 132b may include first electrode layers 131a and 132a which may be firing electrodes including first conductive metal and glass, and second electrode layers 131b and 132b which may be resin-based electrodes including second conductive metal and resin.

Here, the first conductive metal may refer to a conductive metal included in the first electrode layers 131a and 132a, and the second conductive metal may refer to a conductive metal included in the second electrode layers 131b and 132b. In this case, the first conductive metal and the second conductive metal may be the same or different, and may include the same metal material, but an embodiment thereof is not limited thereto.

Also, the electrode layers 131a and 132a, 131b, and 132b may have a form in which a plastic electrode and a resin-based electrode are formed in order on the body.

Also, the electrode layers 131a and 132a, 131b, and 132b may be formed by transferring a sheet including a conductive metal onto a body or by transferring a sheet including a conductive metal onto a fired electrode.

A material having excellent electrical conductivity may be used as the conductive metal included in the electrode layers 131a and 132a, 131b, and 132b. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto.

In an embodiment, the electrode layers 131a and 132a, 131b, and 132b may have a two-layer structure including the first electrode layers 131a and 132a and the second electrode layers 131b and 132b, and accordingly, the external electrodes 131 and 132 may include the first electrode layers 131a and 132a including conductive metal and glass and the second electrode layers 131b and 132b disposed on the first electrode layers 131a and 132a and including conductive metal and resin.

Since the first electrode layers 131a and 132a include glass, the electrode layers may improve bonding with the body 110, and since the second electrode layers 131b and 132b may include resin, the electrode layers may improve warpage strength.

The conductive metal used in the first electrode layers 131a and 132a is not limited to any particular example as long as the material may be electrically connected to the internal electrodes 121 and 122 to form capacitance, and for example, the material may include one or more selected from a group consisting of nickel (Ni), copper (Cu), palladium (Pd), silver (Ag), gold (Au), platinum (Pt), tin (Sn), tungsten (W), titanium (Ti) and alloys thereof. The first electrode layers 131a and 132a may be formed by applying a conductive paste prepared by adding glass frit to the conductive metal powder and firing it.

The conductive metal included in the second electrode layers 131b and 132b may be electrically connected to the first electrode layers 131a and 132a.

The conductive metal included in the second electrode layers 131b and 132b is not limited to any particular example as long as the material may be electrically connected to the electrode layers 131a and 132a, and may include one or more selected from a group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131b and 132b may include at least one of spherical particles and flake particles. That is, the conductive metal may consist of only flake-type particles, only spherical particles, or may be a mixture of flake-type particles and spherical particles. Here, the spherical particle may include a shape which is not perfectly spherical, and may include a shape in which, for example, a length ratio between a major axis and a minor axis (long axis/short axis) is 1.45 or less. Flake-shaped particles may refer to particles having a flat and elongated shape, and are not limited to any particular example, but, for example, a length ratio between a major axis and a minor axis (long axis/short axis) may be 1.95 or more. The lengths of the major and minor axes of the spherical particles and the flake-type particles may be measured from images obtained by scanning cross-sections taken in the first and second directions of the central portion in the third direction of the multilayer electronic component using a scanning electron microscope (SEM). Other methods and/or tools appreciated by one of ordinary skill in the art, even if not described in the present disclosure, may also be used.

The resin included in the second electrode layers 131b and 132b may ensure bonding and absorbing impacts. The resin included in the second electrode layers 131b and 132b is not limited to any particular example as long as the resin has bondability and shock absorption and may be mixed with conductive metal powder to form a paste, and may include, for example, an epoxy resin.

Also, the second electrode layers 131b and 132b may include a plurality of metal particles, an intermetallic compound, and a resin. By including the intermetallic compound, electrical connectivity with the first electrode layers 131a and 132a may be further improved. The intermetallic compound may improve electrical connectivity by connecting a plurality of metal particles, and may surround and connect a plurality of metal particles to each other.

In this case, the intermetallic compound may include a metal having a melting point lower than the curing temperature of the resin. That is, since the intermetallic compound may include a metal having a melting point lower than that the curing temperature of the resin, the metal having a melting point lower than the curing temperature of the resin may be melted during the drying and curing process, and an intermetallic compound may be formed with a portion of the metal particle and may surround the metal particle. In this case, the intermetallic compound may preferably include a metal having a low melting point of 300° C. or less.

For example, Sn having a melting point of 213-220° C. may be included. During the drying and hardening process, Sn may be melted, and the molten Sn may wet high-melting-point metal particles such as Ag, Ni, or Cu by a capillary phenomenon, and may react with some of the Ag, Ni or Cu metal particles and may form intermetallic compounds such as $Ag_3Sn$, $Ni_3Sn_4$, $Cu_6Sn_5$, and $Cu_3Sn$. Ag, Ni, or Cu not participating in the reaction may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131c and 132c may improve mounting properties.

The type of the plating layers 131c and 132c is not limited to any particular example, and single-layer plating layers 131c and 132c including at least one of nickel (Ni), tin (Sn), palladium (Pd), and alloys thereof, and may include a plurality of layers.

For a more specific example of the plating layers 131c and 132c, the plating layers 131c and 132c may be Ni plating layers or Sn plating layers, and Ni plating layers and Sn plating layers may be formed in order on the electrode layers 131a and 132a, 131b, and 132b, and a Sn plating layer, a Ni plating layer, and a Sn plating layer may be formed in order. Also, the plating layers 131c and 132c may include a plurality of Ni plating layers and/or a plurality of Sn plating layers.

The size of the multilayer electronic component 100 may not need to be limited to any particular example.

However, to obtain high capacitance, the multilayer electronic component may have a size of 3216 (length×width: 3.2 mm×1.6 mm) or less. Also, to simultaneously achieve miniaturization and high capacity, the thickness of the dielectric layer and internal electrode may need to be reduced to increase the number of layers, such that the multilayer electronic component may have a size of 1005 (length×width, 1.0 mm×0.5 mm).

Hereinafter, the embodiment will be described in greater detail, but the scope of the embodiment is not limited thereto.

Embodiment

As the main component base material, $BaTiO_3$ particles having an average particle size of 150 nm were used. Using zirconia beads as a mixing/dispersing medium, raw material powders including subcomponents corresponding to the compositions specified in Tables 1, 3, and 5, and the main component $BaTiO_3$ particles were mixed with ethanol/toluene solvent and dispersing agent, milling was performed for 10 hours a binder was mixed, milling was performed for an additional 5 hours. The slurry prepared as above was used to prepare molded sheets with thicknesses of 7.0 μm and 10 μm using a sheet manufacturing machine. Nickel (Ni) internal electrodes were printed on the forming sheet. The upper and lower cover portions were manufactured by laminating 25 layers of cover portion sheets (thickness of 10 μm or more and 13 μm or less), and the 21-layer printed sheets were pressed and laminated to form a bar. The compression bar was cut into 3216 (length×width: 3.2 mm×1.6 mm) size chips using a cutting machine. The 3216 size MLCC chip, which has been manufactured, was calcined and fired in a reducing atmosphere 0.1% $H_2$/99.9% $N_2$-0.5% $H_2$/99.5% $N_2$ ($H_2O/H_2/N_2$ atmosphere) at a temperature of 1240-1280° C. with a holding time of 2 hours, and reoxidation was performed for 3 hours in a $N_2$ atmosphere at 1000° C. Here, the 0.1% hydrogen concentration corresponds to the electromotive force of 670 mV and the 0.5% hydrogen concentration corresponds to the condition of the electromotive force of 760 mV in the measurement environment of 850° C. in the oxygen partial pressure meter. For the fired chip, by performing the termination process and firing the electrode with copper (Cu) paste, the external electrode was formed. Accordingly, after firing, a 3216 size MLCC chip with a thickness of the dielectric layer of approximately 2.0 μm and the number of dielectric layers of 20 layers was manufactured.

The room temperature capacitance and dielectric loss of the MLCC Chip were measured using an LCR meter at 1 kHz and AC 0.5 V/μm. The dielectric constant of the MLCC chip dielectric was calculated from capacitance, the dielectric thickness, the internal electrode area, and the number of layers of the MLCC chip. The room temperature insulation resistance was measured after 60 seconds in a state in which 10 samples were taken and DC 10V/μm was applied. The change in capacitance with temperature was measured in the temperature range of −55° C.-145° C. As for the highly accelerated life time test (HALT), mean time to failure (MTTF) was calculated by measuring the time for failure to occur by applying a voltage corresponding to an electric field of 43 V/μm at 150° C. for 40 samples of each type. Tables 2, 4 and 6 list the properties of the prototype chips corresponding to the embodiments specified in Tables 1, 3 and 5.

Figure 7:
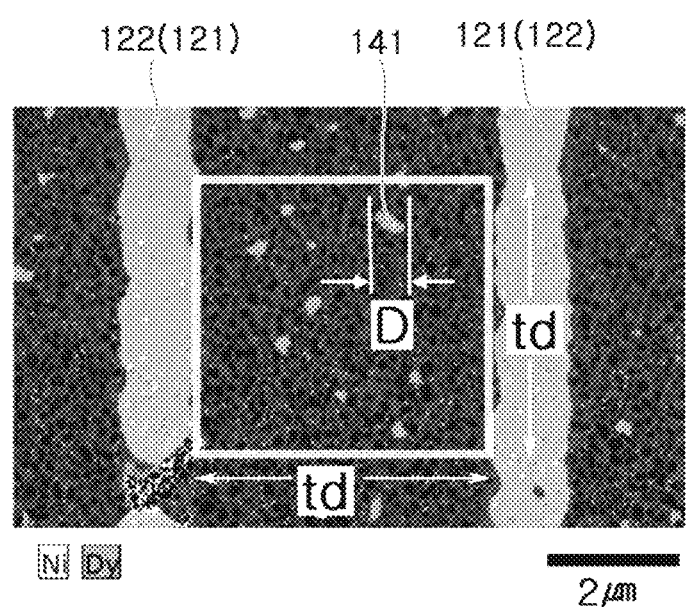
FIG. 7 is a STEM/EDS image obtained by imaging and mapping a capacitance forming portion according to an example embodiment of the present disclosure.
Figure 8A:
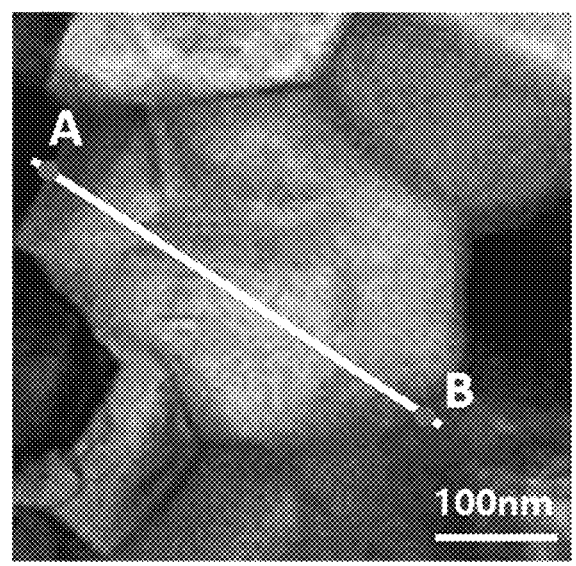
FIG. 8A is a STEM image of a first dielectric grain having a core-shell structure, which is an example embodiment.
Figure 8B:
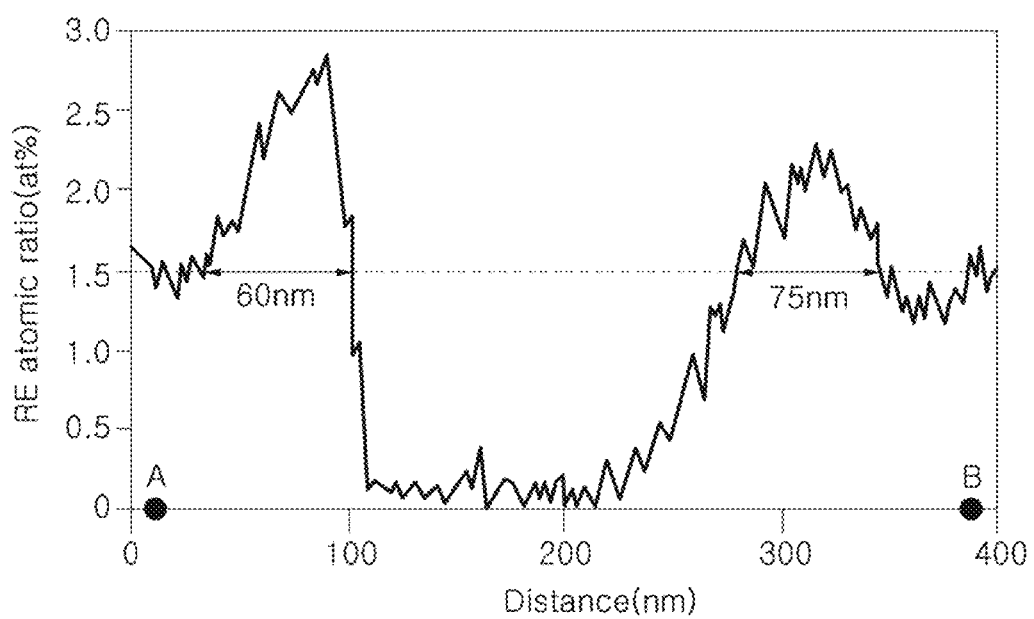
FIG. 8B is a graph illustrating a content of RE obtained by performing line-profile on an AB linear line marked on the same first dielectric grain.
Figure 9A:
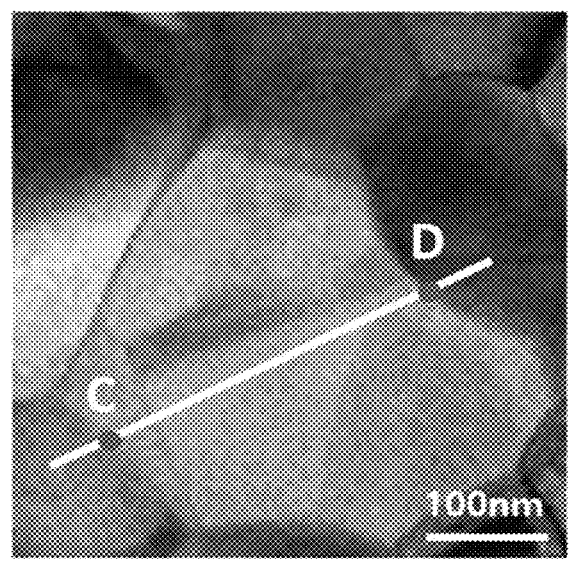
FIG. 9A is a STEM image of a first dielectric grain having a core-shell structure, which is an example embodiment.
Figure 9B:
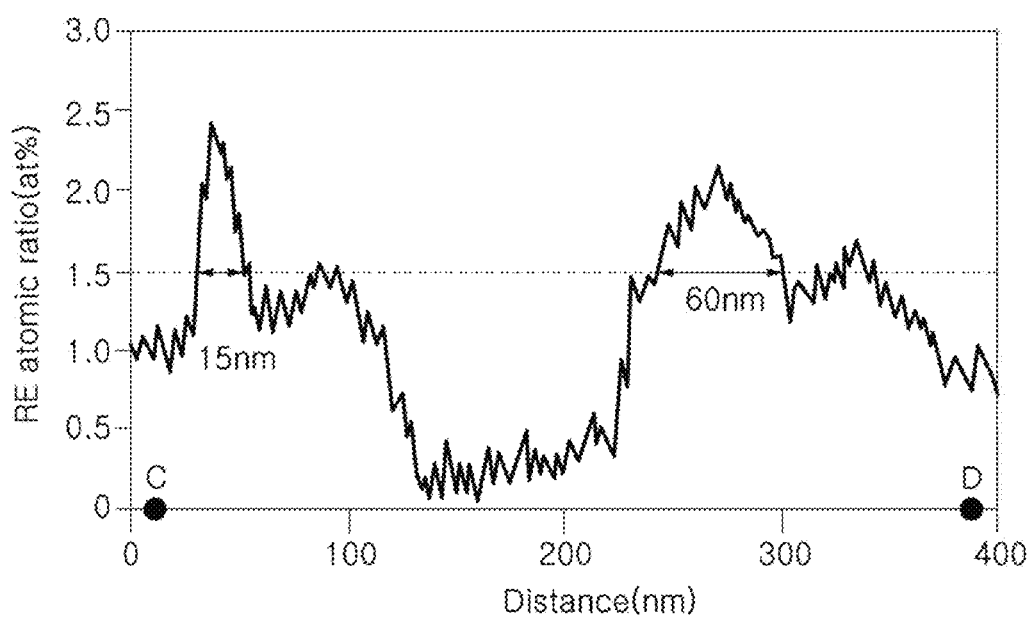
FIG. 9B is a graph illustrating a content of RE by performing line-profile on a CD linear line marked on the same first dielectric grain.

In FIG. 7, it was confirmed that, when the thickness of the dielectric layer is defined as T, and the size in the thickness direction of the dielectric layer of the secondary phase of the rare earth element including 30% or more of the number of moles of the rare earth element (excluding oxygen element) is defined as D, in a random td μm×td μm region, the number of secondary phases of rare earth elements was 2 or more and the condition of D/td 0.2 was satisfied, and an example of a microstructure mapping Ni and Dy components obtained by STEM/EDS analysis of a dielectric material with a high accelerated life is indicated.

In the secondary phase of the rare earth element in the dielectric layer, the components of the secondary phase of the rare earth element were identified in STEM/EDS analysis, and the fraction (%) of the rare earth element was limited such that the ratio [rare earth elements]/([Ba]+[Ti]+[rare earth elements]+[Mg]+[Mn]+[V]+[Si]+[Ca]+[Zr]) of the number of moles of one of more of Y, Dy, Ho, Er, Gd, Ce, Nd, Sm, Tb, Tm, or Gd to the total number of moles of the entirety of elements excluding oxygen was to be 30% or more.

In FIGS. 8A, 8B and 9A, 9B, a random 1 μm×1 μm region was selected in the dielectric layer, in the shell (shell) portion of the main component $BaTiO_3$ dielectric grain consisting of a core-shell (core-shell) structure in the region, a grain in which the thickness of the region where the ratio of the sum of one or more of the rare earth elements Y, Dy, Ho, Er, Gd, Ce, Nd, Sm, Tb, Tm, and Gd to the total elements except oxygen was in the range of 1.5%-3.0% was in the range of 10 nm-80 nm was detected and measured.

As for the multilayer electronic component according to an embodiment, the target was to manufacture a dielectric which may realize all these properties, such as X7R or X7S capacity-temperature (TCC) properties and high high-temperature reliability, and MLCC to which the dielectric was applied under atmosphere firing conditions which may apply nickel (Ni) internal reducing electrode. As the properties assessment standard, the embodiments in which properties of dielectric constant ≥2000, mean time to failure (MTTF) of more than 150 hours under the HALT condition at a temperature of 150° C. and applying electric field of 43 V/μm, RC value ≥1000 ΩF, TCC properties of −15% to +15% in the temperature range of −55° C. to 125° C. were able to be implemented was determined as target properties, and these embodiments will be described.

Depending on the type or content of the subcomponent to be added, at least one of the above properties was satisfied, and when the entirety of the listed properties were satisfied, "0" was marked in the properties evaluation, and when even one of the properties was not satisfied, the embodiment was marked "X." That is, even when "X" is marked, at least one target property among several properties may be satisfied.

The added content of each subcomponent was represented in mol based on the additive, and indicates the added content the number of moles based on 100 mol of $BaTiO_3$ base material (or 100 mol of Ti). For example, in embodiment 1-1, 0.2 mol of $MnO_2$ and 0.1 mol of $V_2O_5$, the first subcomponent, were added, which indicates that 0.2 mol of $MnO_2$ based on 100 mol of $BaTiO_3$ and 0.1 mol of $V_2O_5$ based on 100 mol of $BaTiO_3$ were added. When converted based on the number of moles, the content may be calculated as Mn 0.2 mol and V 0.2 mol, respectively.

Hereinafter, RE of $RE_2O_3$ or RE-rich phase may mean a rare earth element (RE), and may not be redefined in the present invention. A person skilled in the art will be able to distinguish between RE and rare earth elements (RE), which are being redefined in the present invention.

TABLE 1

| Embodiment | Third subcomponent Type | Firing condition EMF (mV) (@850° C./ firing Temperature (° C.)) | First subcomponent $MnO_2$ | $V_2O_5$ | Second subcomponent $MgCO_3$ | Third subcomponent rare earth($RE_2O_3$) | Fourth subcomponent $BaCO_3$ | $CaCO_3$ | Fifth subcomponent $SiO_2$ | (Ba + Ca/Si ratio |
|---|---|---|---|---|---|---|---|---|---|---|
| 1-1 | $La_2O_3$ | 760/1240 | 0.200 | 0.100 | 1.00 | 2.50 | 1.00 | 0.00 | 1.25 | 0.80 |
| 1-2 | $Yb_2O_3$ | 760/1240 | 0.200 | 0.100 | 1.00 | 2.50 | 1.00 | 0.00 | 1.25 | 0.80 |
| 1-3 | $Y_2O_3$ | 760/1240 | 0.200 | 0.100 | 1.00 | 2.50 | 1.00 | 0.00 | 1.25 | 0.80 |
| 1-4 | $Dy_2O_3$ | 760/1240 | 0.200 | 0.100 | 1.00 | 2.50 | 1.00 | 0.00 | 1.25 | 0.80 |
| 1-5 | $Tb_4O_7$ | 760/1240 | 0.200 | 0.100 | 1.00 | 1.25 | 1.00 | 0.00 | 1.25 | 0.80 |
| 1-6 | $Ho_2O_3$ | 760/1240 | 0.200 | 0.100 | 1.00 | 2.50 | 1.00 | 0.00 | 1.25 | 0.80 |
| 1-7 | $Gd_2O_3$ | 760/1240 | 0.200 | 0.100 | 1.00 | 2.50 | 1.00 | 0.00 | 1.25 | 0.80 |
| 2-1 | $Y_2O_3$ | 670/1240 | 0.200 | 0.100 | 1.00 | 2.50 | 1.00 | 0.00 | 1.25 | 0.80 |
| 2-2 | $Y_2O_3$ | 760/1280 | 0.200 | 0.100 | 1.00 | 2.50 | 1.00 | 0.00 | 1.25 | 0.80 |
| 2-3 | $Dy_2O_3$ | 670/1240 | 0.200 | 0.100 | 1.00 | 2.50 | 1.00 | 0.00 | 1.25 | 0.80 |
| 2-4 | $Dy_2O_3$ | 760/1280 | 0.200 | 0.100 | 1.00 | 2.50 | 1.00 | 0.00 | 1.25 | 0.80 |
| 2-5 | $Dy_2O_3$ | 760/1280 ¼ Milling time) | 0.200 | 0.100 | 1.00 | 2.50 | 1.00 | 0.00 | 1.25 | 0.80 |

TABLE 2

| | Proto-type MLCC Chip properties | | | | | | | | | |
|---|---|---|---|---|---|---|---|---|---|---|
| Embodiment | RE-rich phase size(D)/ dielectric layer thickness td | Number of RE-rich phases | Whether main grain condition satisfied | Room temperature dielectric constant | DF(%) | RC(ΩF) | TCC(%) (−55° C.) | TCC(%) 125° C.) | MTTF (h) (@150° C., 43 V/ μm) | properties assessment |
| 1-1 | 0.28 | 1 | X | 2138 | 2.24 | 2564 | −13.2% | −13.5% | 28 | X |
| 1-2 | 0.31 | 1 | ○ | 2120 | 2.18 | 3065 | −13.3% | −13.6% | 45 | X |
| 1-3 | 0.15 | 2 | ○ | 2157 | 2.36 | 2885 | −13.6% | −12.7% | 175 | ○ |
| 1-4 | 0.07 | 4 | ○ | 2251 | 2.53 | 2974 | −14.1% | −14.0% | 236 | ○ |
| 1-5 | 0.08 | 3 | ○ | 2084 | 2.07 | 2888 | −13.3% | −13.5% | 205 | ○ |
| 1-6 | 0.13 | 3 | ○ | 2116 | 2.18 | 2571 | −12.9% | −14.4% | 191 | ○ |
| 1-7 | 0.11 | 5 | ○ | 2305 | 2.35 | 3025 | −13.5% | −14.5% | 212 | ○ |
| 2-1 | 0.26 | 2 | ○ | 2358 | 3.12 | 3125 | −13.5% | −14.9% | 61 | X |
| 2-2 | 0.41 | 1 | ○ | 2365 | 3.35 | 3241 | −14.7% | −11.4% | 52 | X |
| 2-3 | 0.09 | 3 | ○ | 2347 | 3.26 | 2845 | −13.7% | −14.8% | 164 | ○ |
| 2-4 | 0.12 | 3 | ○ | 2353 | 2.98 | 2847 | −13.6% | −12.2% | 188 | ○ |
| 2-5 | 0.13 | 3 | X | 2413 | 3.15 | 3022 | −12.8% | −13.4% | 108 | X |

In embodiments 1-1 to 1-7 in Table 1, when the sum of the first subcomponent variable valence elements (Mn, V) was 0.3 mol main component 150 nm $BaTiO_3$ base material 100 mol, the content of the second subcomponent Mg was 1.0 mol, the content of the third subcomponent rare earth $RE_2O_3$ was 2.5 mol, (5.0 mol based on Dy element), the content of the fourth subcomponent Ba or Ca was 1.0 mol, and the content of the fifth subcomponent $SiO_2$ was 1.25 mol, embodiment according to the type of third subcomponent rare earth element was indicated, and in embodiment 1-1 to embodiment 1-7 in table 2, properties of prototype MLCC samples corresponding to these embodiments are indicated. When the third subcomponent was La and Yb (embodiment 1-1 to embodiment 1-2), D/td became 0.2 or more and MTTF exhibited low properties of less than 150 hours. On the other hand, when the third subcomponent was Y, Dy, Tb, Ho, or Gd, D/td was 0.2 or less in a random dielectric thickness td μm×td μm region under the corresponding firing conditions and a microstructure having two or more RE-rich secondary phases (RE-rich phase, RE-rich secondary phase means secondary phase of rare earth element, the same below) was implemented, and in this case, the MTTF was greatly improved to 150 hours or more, and the entire properties of MTTF of more than 150 hours, RC value ≥1000 ΩF, TCC properties of −15% to +15% in the temperature range of −55° C. to 125° C. were implemented.

The size and distribution of the RE-rich secondary phase may vary depending on the type of rare earth element and firing conditions. When the third subcomponent rare earth element was Y, the hydrogen concentration in the firing atmosphere was as low as 0.1%, such that 850° C. EMF value was as low as 670 mV, and when the firing temperature was as high as 1280° C. (embodiment 2-1 and embodiment 2-2), the D/td became more than 0.2 and the MTTF was extremely lowered, less than 100 hours. On the other hand, when the third subcomponent rare earth element was Dy (embodiment 2-3 and embodiment 2-4), when the third subcomponent was Y, a microstructure with a D/td of 0.2 or less and the number of RE-rich secondary phases of 2 or more in any dielectric layer td μm×td μm region was implemented even under the firing condition of D/td of 0.2 or more, and in this case, MTTF was significantly improved to 150 hours or more, and the entirety of target properties in the example embodiment were implemented. Accordingly, regardless of the type of third subcomponent, when a microstructure with D/td of 0.2 or less and the number of RE-rich secondary phases was 2 or more in the dielectric layer td μm×td μm region, the MTTF significantly improved to 150 hours or more.

In the samples in which all target properties in the example embodiment were implemented in the above embodiment 1-1 to embodiment 2-4, the dielectric layer in the shell portion of the main component $BaTiO_3$ grain consisting having a core-shell structure within an arbitrary 1 μm×1 μm region, as for the content of rare earth elements, a grain in which the thickness of the region where the ratio of the sum of one or more of the rare earth elements Y, Dy, Ho, Er, Gd, Ce, Nd, Sm, Tb, Tm, and Gd to the total elements except oxygen was in the range of 1.5%-3.0% was in the range of 10 nm-80 nm was present, and the number of grains was always 3 or more, which may be the main grain satisfaction condition for obtaining the target properties in the embodiment.

In embodiments 2-5 of Table 1, the same composition and firing conditions as those of Embodiments 2-4 were applied, and the batch milling time was reduced to ¼ and embodiments of conditions in which the additive dispersion state was not good was indicated, and the embodiments in Table 2 2-5 indicates electrical properties thereof. In this case, a microstructure with D/td of 0.2 or less and the number of RE-rich secondary phases exceeding 2 was implemented in the dielectric layer td μm×td μm region, but the content and distribution of rare earth elements in the main grain did not correspond to the above main grain satisfaction conditions, and MTTF was less than 150 hours such that target properties were not implemented. Also, as in embodiment 1-2, the content and distribution of rare earth elements in the main grain corresponded to the main grain satisfaction condition, but in the dielectric layer td μm×td μm region, when a microstructure in which D/td was less than 0.2 and the number of RE-rich secondary phases was 2 or more was not implemented, the target properties in the example embodiment may not be implemented.

Accordingly, to implement the target properties in the example embodiment, when the dimension (length) in the dielectric thickness direction of the secondary phase in which the sum of one or two or more elements among the rare earth elements Y, Dy, Ho, Er, Gd, Ce, Nd, Sm, Tb, Tm, and Gd, which are conditions of the secondary phase, was 30 at % or more was defined as D, within a random td μm×td μm region, the number of secondary phases was always 2 or more and the condition of D/td≤0.2 was satisfied, and also, within the dielectric layer arbitrary 1 μm×1 μm region, which is the condition of the main grain, in the shell portion of the main component $BaTiO_3$ grain consisting having a core-shell structure, when a grain in which the thickness of the region where the ratio of the sum of one or more of the rare earth elements Y, Dy, Ho, Er, Gd, Ce, Nd, Sm, Tb, Tm, and Gd to the total elements except oxygen was in the range of 1.5%-3.0% was in the range of 10 nm-80 nm was present, and when three or more dielectrics are implemented at the same time, target properties in the embodiment are implemented.

TABLE 3

| Embodiment | Third subcomponent Type | Firing condition EMF (mV) (@850° C.) | First subcomponent $MnO_2$ | | Second subcomponent $MgCO_3$ | Third subcomponent rare earth ($RE_2O_3$) | Fourth subcomponent $BaCO_3$ | $CaCO_3$ | Fifth subcomponent $SiO_2$ | (Ba + Ca/Si ratio |
|---|---|---|---|---|---|---|---|---|---|---|
| | | | | $V_2O_5$ | | | | | | |
| 3-1 | $Dy_2O_3$ | 760 | 0.200 | 0.100 | 0.00 | 0.50 | 1.00 | 0.00 | 1.25 | 0.80 |
| 3-2 | $Dy_2O_3$ | 760 | 0.200 | 0.100 | 0.00 | 1.00 | 1.00 | 0.00 | 1.25 | 0.80 |
| 3-3 | $Dy_2O_3$ | 760 | 0.200 | 0.100 | 0.00 | 1.25 | 1.00 | 0.00 | 1.25 | 0.80 |
| 3-4 | $Dy_2O_3$ | 760 | 0.200 | 0.100 | 0.00 | 2.00 | 1.00 | 0.00 | 1.25 | 0.80 |
| 3-5 | $Dy_2O_3$ | 760 | 0.200 | 0.100 | 0.00 | 2.50 | 1.00 | 0.00 | 1.25 | 0.80 |
| 3-6 | $Dy_2O_3$ | 760 | 0.200 | 0.100 | 0.00 | 3.00 | 1.00 | 0.00 | 1.25 | 0.80 |
| 3-7 | $Dy_2O_3$ | 760 | 0.200 | 0.100 | 0.00 | 4.00 | 1.00 | 0.00 | 1.25 | 0.80 |

TABLE 3-continued

| Embodiment | Third subcomponent Type | Firing condition EMF (mV) (@850° C.) | First subcomponent MnO$_2$ | V$_2$O$_5$ | Second subcomponent MgCO$_3$ | Third subcomponent rare earth (RE$_2$O$_3$) | Fourth subcomponent BaCO$_3$ | CaCO$_3$ | Fifth subcomponent SiO$_2$ | (Ba + Ca/Si ratio |
|---|---|---|---|---|---|---|---|---|---|---|
| 3-8 | Dy$_2$O$_3$ | 760 | 0.200 | 0.100 | 0.00 | 4.50 | 1.00 | 0.00 | 1.25 | 0.80 |
| 3-9 | Dy$_2$O$_3$ | 760 | 0.200 | 0.100 | 0.00 | 5.00 | 1.00 | 0.00 | 1.25 | 0.80 |
| 4-1 | Dy$_2$O$_3$ | 760 | 0.200 | 0.100 | 0.20 | 2.50 | 1.00 | 0.00 | 1.25 | 0.80 |
| 4-2 | Dy$_2$O$_3$ | 760 | 0.200 | 0.100 | 0.50 | 2.50 | 1.00 | 0.00 | 1.25 | 0.80 |
| 4-3 | Dy$_2$O$_3$ | 760 | 0.200 | 0.100 | 1.00 | 2.50 | 1.00 | 0.00 | 1.25 | 0.80 |
| 4-3 | Dy$_2$O$_3$ | 760 | 0.200 | 0.100 | 2.00 | 2.50 | 1.00 | 0.00 | 1.25 | 0.80 |
| 4-4 | Dy$_2$O$_3$ | 760 | 0.200 | 0.100 | 3.00 | 2.50 | 1.00 | 0.00 | 1.25 | 0.80 |
| 5-1 | Dy$_2$O$_3$ | 760 | 0.050 | 0.025 | 1.00 | 2.50 | 1.00 | 0.00 | 1.25 | 0.80 |
| 5-2 | Dy$_2$O$_3$ | 760 | 0.100 | 0.050 | 1.00 | 2.50 | 1.00 | 0.00 | 1.25 | 0.80 |
| 5-3 | Dy$_2$O$_3$ | 760 | 0.700 | 0.350 | 1.00 | 2.50 | 1.00 | 0.00 | 1.25 | 0.80 |
| 5-4 | Dy$_2$O$_3$ | 760 | 1.000 | 0.500 | 1.00 | 2.50 | 1.00 | 0.00 | 1.25 | 0.80 |
| 5-5 | Dy$_2$O$_3$ | 760 | 0.500 | 0.000 | 1.00 | 2.50 | 1.00 | 0.00 | 1.25 | 0.80 |
| 5-6 | Dy$_2$O$_3$ | 760 | 0.000 | 0.250 | 1.00 | 2.50 | 1.00 | 0.00 | 1.25 | 0.80 |

TABLE 4

Proto-type MLCC Chip properties

| Embodiment | RE-rich phase size(D)/dielectric layer thickness td | Number of RE-rich phases | Whether main grain condition satisfied | Room temperature dielectric constant | DF(%) | RC(ΩF) | TCC(%) (−55° C.) | TCC(%) 125° C.) | MTTF (h) (@150° C., 43 V/μm) | Properties assessment |
|---|---|---|---|---|---|---|---|---|---|---|
| 3-1 | 0 | 0 | X | 3478 | 5.36 | 3647 | −13.7% | −23.4% | 112 | X |
| 3-2 | 0 | 0 | ○ | 3250 | 4.68 | 2874 | −14.5% | −17.8% | 173 | X |
| 3-3 | 0.05 | 2 | ○ | 2341 | 3.12 | 3745 | −13.5% | −14.3% | 194 | ○ |
| 3-4 | 0.06 | 3 | ○ | 2250 | 2.81 | 2567 | −14.2% | −14.0% | 256 | ○ |
| 3-5 | 0.07 | 4 | ○ | 2251 | 2.53 | 2974 | −14.1% | −14.0% | 236 | ○ |
| 3-6 | 0.13 | 4 | ○ | 2187 | 2.46 | 2865 | −13.5% | −13.5% | 204 | ○ |
| 3-7 | 0.18 | 5 | ○ | 2174 | 2.35 | 2545 | −13.4% | −13.2% | 165 | ○ |
| 3-8 | 0.19 | 5 | X | 1923 | 2.11 | 3256 | −13.4% | −13.2% | 165 | X |
| 3-9 | 0.27 | 2 | X | 1857 | 1.95 | 2436 | −12.8% | −13.0% | 91 | X |
| 4-1 | 0.06 | 4 | ○ | 2263 | 2.57 | 2875 | −14.2% | −13.9% | 247 | ○ |
| 4-2 | 0.08 | 3 | ○ | 2845 | 2.69 | 3012 | −13.6% | −14.2% | 225 | ○ |
| 4-3 | 0.07 | 4 | ○ | 3412 | 2.08 | 2865 | −13.7% | −14.5% | 220 | ○ |
| 4-3 | 0.09 | 4 | ○ | 4123 | 1.95 | 3125 | −14.1% | −14.9% | 167 | ○ |
| 4-4 | 0.08 | 3 | ○ | 5025 | 1.84 | 3279 | −14.1% | −16.2% | 88 | X |
| 5-1 | 0.06 | 4 | ○ | 2285 | 2.15 | 3132 | −13.7% | −14.8% | 92 | X |
| 5-2 | 0.07 | 3 | ○ | 2196 | 2.12 | 2865 | −13.5% | −14.5% | 174 | ○ |
| 5-3 | 0.06 | 4 | ○ | 2046 | 2.08 | 2865 | −13.7% | −13.9% | 153 | ○ |
| 5-4 | 0.06 | 4 | ○ | 1785 | 1.54 | 2065 | −12.5% | −13.3% | 76 | X |
| 5-5 | 0.06 | 4 | ○ | 2187 | 2.08 | 2865 | −13.7% | −13.7% | 218 | ○ |
| 5-6 | 0.06 | 4 | ○ | 2234 | 2.17 | 2758 | −13.7% | −13.5% | 215 | ○ |

Embodiments 3-1 to 5-6 in Table 3 are embodiments according to changes in the third subcomponent, the second subcomponent, and the first subcomponent content for 100 mol of the main component 150 nm BaTiO$_3$ base material, and table 4 shows the properties of the samples corresponding to these embodiments. When the content of the third subcomponent, Dy$_2$O$_3$, was relatively small, such as 1.0 mol or 2.0 at % as an elemental ratio (embodiment 3-1 to embodiment 3-2), the condition does not correspond to the satisfactory condition of the main grain in the example embodiment, or Even if the condition satisfies the satisfactory condition of the main grain, there was no RE-rich secondary phase, such that high-temperature TCC (125° C.) properties were out of specification or MTTF properties were low, less than the target value of 150 hours in the embodiment, and accordingly, target properties were not be implemented. Also, when the content of Dy$_2$O$_3$ was relatively large, such as 4.5 mol or 9.0 at % as an elemental ratio (embodiment 3-8 to embodiment 3-9), the rare earth content of the main grain shell region exceeded 3.0 at %, which did not correspond to the satisfactory condition of the embodiment, such that the dielectric constant was lowered to less than 2000, or the size of the RE-rich secondary phase was excessively increased, such that, in any dielectric layer td μm×td μm region, D/td became 0.2 or more, and MTTF properties were less than 150 hours and the target properties in the embodiment were not implemented. When the content of Dy$_2$O$_3$ was 1.25 mol-4.0 mol or in the range of 2.5 at %-8.00 at % as a Dy element ratio (embodiment 3-3 to embodiment 3-7), both the main grain satisfaction condition and the secondary phase condition in the example embodiment were satisfied, and in this case, properties of mean time to failure (MTTF) of more than 150 hours, RC value ≥1000 ΩF, TCC properties of −15% to +15% in the temperature range of −55° C. to 125° C. under the HALT condition applying electric field 43 V/μm at dielectric constant ≥2000 and temperature 150° C. were satisfied.

In embodiment 4-1 to embodiment 4-4, when Mg, which is a second subcomponent, was added, the RC value may increase. However, in case of excessively content, 3.0 mol or 3.0 at %, MTTF properties appeared less than 100 hours, which is the target value in the embodiment, and properties were not realized. When the content of the second subcomponent MgCO$_3$ was in the range of 0 mol (not added)-2.0 mol or 0 at % (not added)-2.0 at % as an elemental ratio of Mg (embodiment 4-1 to embodiment 4-3), the entirety of properties may be implemented. In embodiment 5-1 to embodiment 5-6, when the sum of the contents of Mn and V, which are transition metals, was too small as an element ratio of 0.1 at % (embodiment 5-1), MTTF properties were less than 100 hours, which is the target value in the embodiment, and properties were not implemented. Also, when the sum of the contents of Mn and V, which are transition metals, was too excessive, an element ratio of 2.0 at % (embodiment 5-4), the RC value was less than 1000 and the MTTF was less than 150 hours such that the target properties in the embodiment were not satisfied. Embodiments 5-5 to embodiments 5-6 are cases in which 0.5 at % was added as an element ratio to Mn alone or V alone, and in both cases, target properties in the example embodiment may be implemented. Accordingly, the content of the first subcomponent for implementing the target properties in the example embodiment may be 0.2 at %-1.4 at % in element ratio.

TABLE 5

| Embodiment | Third subcomponent Type | Firing condition EMF (mV) (@850° C.) | First subcomponent MnO$_2$ | First subcomponent V$_2$O$_5$ | Second subcomponent MgCO$_3$ | Third subcomponent rare earth(RE$_2$O$_3$) | Fourth subcomponent BaCO$_3$ | Fourth subcomponent CaCO$_3$ | Fifth subcomponent SiO$_2$ | (Ba + Ca)/Si ratio |
|---|---|---|---|---|---|---|---|---|---|---|
| 6-1 | Dy$_2$O$_3$ | 760 | 0.200 | 0.100 | 1.00 | 2.50 | 0.00 | 0.00 | 0.50 | 0.00 |
| 6-2 | Dy$_2$O$_3$ | 760 | 0.200 | 0.100 | 1.00 | 2.50 | 0.24 | 0.00 | 0.50 | 0.48 |
| 6-3 | Dy$_2$O$_3$ | 760 | 0.200 | 0.100 | 1.00 | 2.50 | 0.80 | 0.00 | 0.50 | 1.60 |
| 7-1 | Dy$_2$O$_3$ | 760 | 0.200 | 0.100 | 1.00 | 2.50 | 0.00 | 0.00 | 0.80 | 0.00 |
| 7-2 | Dy$_2$O$_3$ | 760 | 0.200 | 0.100 | 1.00 | 2.50 | 0.38 | 0.00 | 0.80 | 0.48 |
| 7-3 | Dy$_2$O$_3$ | 760 | 0.200 | 0.100 | 1.00 | 2.50 | 1.28 | 0.00 | 0.80 | 1.60 |
| 7-4 | Dy$_2$O$_3$ | 760 | 0.200 | 0.100 | 1.00 | 2.50 | 1.50 | 0.00 | 0.80 | 1.88 |
| 8-1 | Dy$_2$O$_3$ | 760 | 0.200 | 0.100 | 1.00 | 2.50 | 0.00 | 0.00 | 1.65 | 0.00 |
| 8-2 | Dy$_2$O$_3$ | 760 | 0.200 | 0.100 | 1.00 | 2.50 | 0.40 | 0.00 | 1.65 | 0.24 |
| 8-3 | Dy$_2$O$_3$ | 760 | 0.200 | 0.100 | 1.00 | 2.50 | 1.20 | 0.00 | 1.65 | 0.73 |
| 8-4 | Dy$_2$O$_3$ | 760 | 0.200 | 0.100 | 1.00 | 2.50 | 2.64 | 0.00 | 1.65 | 1.60 |
| 8-5 | Dy$_2$O$_3$ | 760 | 0.200 | 0.100 | 1.00 | 2.50 | 3.10 | 0.00 | 1.65 | 1.88 |
| 8-6 | Dy$_2$O$_3$ | 760 | 0.200 | 0.100 | 1.00 | 2.50 | 0.60 | 0.60 | 1.65 | 0.73 |
| 8-7 | Dy$_2$O$_3$ | 760 | 0.200 | 0.100 | 1.00 | 2.50 | 0.00 | 1.20 | 1.65 | 0.73 |
| 9-1 | Dy$_2$O$_3$ | 760 | 0.200 | 0.100 | 1.00 | 2.50 | 0.00 | 0.00 | 3.00 | 0.00 |
| 9-2 | Dy$_2$O$_3$ | 760 | 0.200 | 0.100 | 1.00 | 2.50 | 1.45 | 0.00 | 3.00 | 0.48 |
| 9-3 | Dy$_2$O$_3$ | 760 | 0.200 | 0.100 | 1.00 | 2.50 | 4.80 | 0.00 | 3.00 | 1.60 |
| 9-4 | Dy$_2$O$_3$ | 760 | 0.200 | 0.100 | 1.00 | 2.50 | 5.63 | 0.00 | 3.00 | 1.88 |
| 10-1 | Dy$_2$O$_3$ | 760 | 0.200 | 0.100 | 1.00 | 2.50 | 0.00 | 0.00 | 4.00 | 0.00 |
| 10-2 | Dy$_2$O$_3$ | 760 | 0.200 | 0.100 | 1.00 | 2.50 | 6.40 | 0.00 | 4.00 | 1.60 |

TABLE 6

| | Proto-type MLCC Chip properties | | | | | | | | | |
|---|---|---|---|---|---|---|---|---|---|---|
| Embodiment | RE-rich phase size(D)/ dielectric layer thickness td | Number of RE-rich phases | Whether main grain condition satisfied | Room temperature dielectric constant | DF(%) | RC(ΩF) | TCC(%) (−55° C.) | TCC(%) 125° C.) | MTTF (h) (@150° C., 43 V/μm) | Properties assessment |
| 6-1 | — | — | — | 1680 | 1.55 | 1135 | — | — | 45 | X |
| 6-2 | — | — | — | 1867 | 1.64 | 1250 | — | — | 56 | X |
| 6-3 | — | — | — | 1587 | 1.58 | 985 | — | — | 38 | X |
| 7-1 | 0.12 | 4 | ○ | 2085 | 1.95 | 1950 | −12.2% | −12.5% | 187 | ○ |
| 7-2 | 0.08 | 6 | ○ | 2278 | 2.65 | 2345 | −14.8% | −13.2% | 178 | ○ |
| 7-3 | 0.09 | 5 | ○ | 2453 | 2.48 | 2564 | −14.2% | −13.5% | 164 | ○ |
| 7-4 | 0.07 | 4 | ○ | 1756 | 1.85 | 2417 | −13.5% | −13.8% | 75 | X |
| 8-1 | 0.06 | 4 | ○ | 2064 | 1.87 | 2046 | −14.5% | −14.2% | 212 | ○ |
| 8-2 | 0.07 | 5 | ○ | 2132 | 2.27 | 2020 | −14.5% | −14.2% | 227 | ○ |
| 8-3 | 0.15 | 5 | ○ | 2285 | 2.25 | 2284 | −14.4% | −14.5% | 198 | ○ |
| 8-4 | 0.06 | 5 | ○ | 2342 | 1.86 | 2413 | −14.2% | −14.6% | 187 | ○ |
| 8-5 | 0.07 | 4 | ○ | 1856 | 1.55 | 1852 | −13.2% | −12.5% | 88 | X |
| 8-6 | 0.05 | 7 | ○ | 2323 | 2.27 | 2345 | −14.3% | −14.2% | 185 | ○ |
| 8-7 | 0.08 | 4 | ○ | 2251 | 2.03 | 2458 | −14.5% | −14.5% | 181 | ○ |
| 9-1 | 0.09 | 5 | ○ | 2068 | 2.28 | 2111 | −14.8% | −13.5% | 195 | ○ |
| 9-2 | 0.11 | 5 | ○ | 2122 | 2.27 | 2078 | −14.1% | −13.9% | 185 | ○ |
| 9-3 | 0.14 | 4 | ○ | 2205 | 1.94 | 2071 | −14.2% | −14.1% | 173 | ○ |
| 9-4 | 0.08 | 4 | ○ | 1745 | 1.87 | 1784 | −13.8% | −13.2% | 122 | X |
| 10-1 | 0.09 | 4 | ○ | 1642 | 1.69 | 1952 | −13.5% | −13.4% | 85 | X |
| 10-2 | 0.07 | 4 | ○ | 1528 | 1.56 | 2238 | −13.6% | −14.4% | 47 | X |

Table 5 lists embodiments according to the fourth subcomponent and fifth subcomponent content changes for 100 mol of the main component 150 nm BaTiO$_3$ base material, and Table 6 lists the properties of samples corresponding to these embodiments. When the content of the fifth subcomponent SiO$_2$ was as small as 0.5 mol (embodiment 6-1 to embodiment 6-3), the firing density was low regardless of the fourth subcomponent content, such that room temperature dielectric constant and MTTF were low. In each SiO$_2$ content, under the condition that the ratio of (Ba+Ca)/Si becomes 0.48 when an appropriate amount of Ba, the fourth subcomponent, was added (embodiment 7-2, embodiment 8-3, and embodiment 9-2), as compared to the condition where the ratio was 0 (embodiment 7-1, embodiment 8-1, and embodiment 9-1), the room temperature dielectric constant rose while satisfying all the properties in the embodiment. However, under the condition in which SiO$_2$ was excessively added and the ratio of (Ba+Ca)/Si was 1.88 (embodiment 7-4, embodiment 8-5, embodiment 9-4), the room temperature dielectric constant was less than 2000 or the MTTF was less than 100 hours, such that the target properties of the embodiment were not satisfied. From embodiment 6-1 to embodiment 9-4, when the ratio of the fourth subcomponent and the fifth subcomponent (Ba+Ca)/Si fell within the range of 1.60 or less, the target properties in the embodiment were implemented. In embodiment 10-1 to embodiment 10-2 are embodiments according to the change of BaCO$_3$ content when the content of the fifth subcomponent SiO$_2$ was 4.0 mol or 4.0 at % as an element ratio. In this case, even if the ratio (Ba+Ca)/Si of the fourth subcomponent and fifth subcomponent fell within the range of 1.60 or less, the room temperature dielectric constant and MTTF were lower than the target values in the embodiment, such that target properties were not implemented. Therefore, to summarize the fourth subcomponent and fifth subcomponent change embodiment, when the content of the fourth subcomponent was 4.8 mol or the range of 4.8 at % or less in terms of element ratio, the content of SiO$_2$, the fifth subcomponent, was in the range of 0.8 mol-3.0 mol or 0.8 at %-3.0 at % in element ratio, and the fourth subcomponent and the fifth subcomponent ratio (Ba+Ca)/Si ratio was within the range of 1.60 or less, the target properties of the embodiment may be implemented.

According to the aforementioned example embodiments, reliability of the multilayer electronic component may improve.

Also, X7R or X7S properties of the multilayer electronic component may be satisfied.

Also, the MTTF of high-temperature and high-accelerated life of the multilayer electronic component may improve.

Also, capacitance of the multilayer electronic component may improve.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and an internal electrode; and
an external electrode disposed on the body,
wherein the dielectric layer includes a rare earth element, a secondary phase of the rare earth element, and a dielectric grain,
wherein, an average thickness of the dielectric layer is defined as td, a maximum size of the secondary phase of the rare earth element in a thickness direction of the dielectric layer is defined as D, and two or more of the secondary phases satisfies D/td≤0.2, and
wherein the dielectric grain includes a first dielectric grain having a core-shell structure including a core portion and a shell portion disposed on at least a portion of the core portion, a ratio of a number of moles of the rare earth element to a total number of moles of the entirety of elements other than an oxygen element is defined as RE, a shell portion of the first dielectric grain includes a region satisfying 1.5%≤RE≤3.0%.

2. The multilayer electronic component of claim 1, wherein the dielectric layer includes a region including the two or more of the secondary phases satisfying D/td≤0.2 in a td μm×td μm region.

3. The multilayer electronic component of claim 1, wherein, a length of the first dielectric grain is defined as G, a length of the region satisfying 1.5%≤RE≤3.0% is defined as d with respect to a linear line L passing through a center of the first dielectric grain, and 2.5%≤d/G≤47.0% is satisfied.

4. The multilayer electronic component of claim 3, wherein d is 10 nm or more and 80 nm or less.

5. The multilayer electronic component of claim 3,
wherein the dielectric layer includes a main component including Ti and first to sixth subcomponents,
wherein the first subcomponent includes a variable valence acceptor element including at least one of Mn, V, Cr, Fe, Co, Ni, Cu, Co, and Zn, and a content of the first subcomponent is 0.2 mol or more and 1.4 mol or less based on 100 mol of Ti,
wherein the second subcomponent includes Mg, and a content of the second subcomponent is 2.0 mol or less based on 100 mol of Ti,
wherein the third subcomponent includes a rare earth element including at least one of Y, Dy, Tb, Ho, Er, Gd, Ce, Nd, Sm, Tm, La, and Yb, and a content of the third subcomponent is 2.5 mol or more and 8.0 mol or less based on 100 mol of Ti,
wherein the fourth subcomponent includes at least one element of Ba and Ca, and a content of the fourth subcomponent is 4.8 mol or less based on 100 mol of Ti, and
wherein the fifth subcomponent includes Si, and a content of the fifth subcomponent is 1.0 mol or more and less than 4.0 mol based on 100 mol of Ti.

6. The multilayer electronic component of claim 1, wherein the dielectric layer includes a region including three or more first dielectric grains in a 1 μm×1 μm region.

7. The multilayer electronic component of claim 1, wherein, in the secondary phase, the ratio of the number of moles of the rare earth element to the total number of moles of the entirety of elements excluding oxygen element is 30% or more.

8. The multilayer electronic component of claim 1, wherein the dielectric layer includes a main component including Ti, and a subcomponent.

9. The multilayer electronic component of claim 8,
wherein the subcomponent includes a first subcomponent including a variable valence acceptor element,
wherein the variable valence acceptor element includes at least one of Mn, V, Cr, Fe, Co, Ni, Cu, Co, and Zn, and
wherein a content of the first subcomponent is 0.2 mol or more and 1.4 mol or less based on 100 mol of Ti.

10. The multilayer electronic component of claim 8,
wherein the subcomponent includes a second subcomponent including Mg, and wherein a content of the second subcomponent is 2.0 mol or less based on 100 mol of Ti.

11. The multilayer electronic component of claim 8, wherein the subcomponent includes a third subcomponent including a rare earth element,
wherein the rare earth element includes at least one of Y, Dy, Tb, Ho, Er, Gd, Ce, Nd, Sm, Tm, La, and Yb, and
wherein a content of the third subcomponent is 2.5 mol or more and 8.0 mol or less based on 100 mol of Ti.

12. The multilayer electronic component of claim 8, wherein the subcomponent includes a fourth subcomponent including at least one element of Ba and Ca, and
wherein a content of the fourth subcomponent is 4.8 mol or less based on 100 mol of Ti.

13. The multilayer electronic component of claim 12, wherein the subcomponent includes a fifth subcomponent including Si, and a content of the fifth subcomponent is 1.0 mol more and less than 4.0 mol based on 100 mol of Ti, and
wherein a ratio of the content of the fourth subcomponent to the content of the fifth subcomponent is 1.60 or less.

14. The multilayer electronic component of claim 8, wherein the subcomponent includes a fifth subcomponent including Si, and
wherein a content of the fifth subcomponent is 1.0 mol or more and less than 4.0 mol based on 100 mol of Ti.

15. The multilayer electronic component of claim 1, wherein the dielectric layer includes a plurality of dielectric layers, and
wherein an average thickness of at least one of the plurality of dielectric layers is 3.0 μm or less.

16. The multilayer electronic component of claim 1, wherein the internal electrode includes a plurality of internal electrodes, and
wherein an average thickness of at least one of the plurality of internal electrodes is 1.0 μm or less.

17. The multilayer electronic component of claim 1, wherein the dielectric layer includes a plurality of dielectric layers, the internal electrode includes a plurality of internal electrodes, and
wherein, an average thickness of at least one of the plurality of dielectric layers is defined as td1 and an average thickness of at least one of the plurality of internal electrodes is defined as te1, te1×2<td1 is satisfied.

18. The multilayer electronic component of claim 1, wherein the dielectric layer includes a main component including Ti, and first to sixth subcomponents,
wherein the first subcomponent includes a variable valence acceptor element including at least one of Mn, V, Cr, Fe, Co, Ni, Cu, Co, and Zn, and a content of the first subcomponent is 0.2 mol or more and 1.4 mol or less based on 100 mol of Ti,
wherein the second subcomponent includes Mg, and a content of the second subcomponent is 2.0 mol or less based on 100 mol of Ti,
wherein the third subcomponent includes a rare earth element including at least one of Y, Dy, Tb, Ho, Er, Gd, Ce, Nd, Sm, Tm, La, and Yb, and a content of the third subcomponent is 2.5 mol or more and 8.0 mol or less based on 100 mol of Ti,
wherein the fourth subcomponent includes at least one element of Ba and Ca, and a content of the fourth subcomponent is 4.8 mol or less based on 100 mol of Ti, and
wherein the fifth subcomponent includes Si, and a content of the fifth subcomponent is 1.0 mol or more and less than 4.0 mol based on 100 mol of Ti.

19. A multilayer electronic component, comprising:
a body including a dielectric layer and an internal electrode; and
an external electrode disposed on the body,
wherein the dielectric layer includes a rare earth element, a secondary phase of the rare earth element, and a dielectric grain,
wherein the dielectric grain includes a first dielectric grain having a core-shell structure including a core portion and a shell portion disposed on at least a portion of the core portion, a ratio of a number of moles of the rare earth element to a total number of moles of the entirety of elements other than an oxygen element is defined as RE, a shell portion of the first dielectric grain includes a region satisfying $1.5\% \leq RE \leq 3.0\%$.

20. The multilayer electronic component of claim 19, wherein the dielectric layer includes a region including two or more of the secondary phases satisfying $D/td \leq 0.2$ in a td μm×td μm region, where td is an average thickness of the dielectric layer, and D is a maximum size of the secondary phase of the rare earth element in a thickness direction of the dielectric layer, and
in the secondary phase, the ratio of the number of moles of the rare earth element to the total number of moles of the entirety of elements excluding oxygen element is 30% or more.

* * * * *